US012739804B2

(12) United States Patent
Hwang et al.

(10) Patent No.: US 12,739,804 B2
(45) Date of Patent: Sep. 15, 2026

(54) METHOD AND DEVICE FOR TRANSMITTING AND RECEIVING WIRELESS SIG-NALS IN WIRELESS COMMUNICATION SYSTEM

(71) Applicant: LG ELECTRONICS INC., Seoul (KR)

(72) Inventors: Seunggye Hwang, Seoul (KR); Seonwook Kim, Seoul (KR); Jaehyung Kim, Seoul (KR); Suckchel Yang, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 18/715,655

(22) PCT Filed: Jan. 11, 2023

(86) PCT No.: PCT/KR2023/000499

§ 371 (c)(1),
(2) Date: May 31, 2024

(87) PCT Pub. No.: WO2023/136600

PCT Pub. Date: Jul. 20, 2023

(65) Prior Publication Data

US 2025/0031189 A1 Jan. 23, 2025

(30) Foreign Application Priority Data

Jan. 11, 2022 (KR) ........................ 10-2022-0004256
Feb. 11, 2022 (KR) ........................ 10-2022-0018450

(51) Int. Cl.
*H04W 76/28* (2018.01)
*H04L 5/00* (2006.01)
(Continued)

(52) U.S. Cl.
CPC ....... *H04W 72/0446* (2013.01); *H04L 5/0082* (2013.01); *H04W 68/00* (2013.01); *H04W 72/23* (2023.01); *H04W 76/28* (2018.02)

(58) Field of Classification Search
None
See application file for complete search history.

(56) References Cited

U.S. PATENT DOCUMENTS

2019/0223153 A1 7/2019 Kim
2020/0163048 A1* 5/2020 Kim ...................... H04W 72/12
(Continued)

FOREIGN PATENT DOCUMENTS

CN 115334618 A * 11/2022 ........ H04W 52/0229
EP 4462930 11/2024
(Continued)

OTHER PUBLICATIONS

PCT International Application No. PCT/KR2023/000499, Written Opinion and International Search Report dated Apr. 24, 2023, 5 pages.
(Continued)

*Primary Examiner* — Jenkey Van
(74) *Attorney, Agent, or Firm* — LEE, HONG, DEGERMAN, KANG & WAIMEY

(57) ABSTRACT

According to at least one of the embodiments disclosed in the present specification, configuration information for a first signal is received, a second signal including information about the first signal is received from at least one of time resources determined on the basis of a plurality of periodicities, the validity of the configuration information for the first signal is determined on the basis of the reception of the second signal, and an operation related to the first signal is performed on the basis of the determination that the configuration information for the first signal is valid, wherein
(Continued)

the terminal can determine the validity of the configuration information for the first signal on the basis of the position of a time resource at which the second signal was received within a corresponding time resource group.

15 Claims, 17 Drawing Sheets

(51) Int. Cl.

| | |
|---|---|
| ***H04W 68/00*** | (2009.01) |
| ***H04W 72/0446*** | (2023.01) |
| ***H04W 72/23*** | (2023.01) |

(56) References Cited

U.S. PATENT DOCUMENTS

| | | | | |
|---|---|---|---|---|
| 2024/0080152 | A1* | 3/2024 | Shrivastava | H04W 52/0235 |
| 2024/0163790 | A1* | 5/2024 | Nagano | H04W 56/00 |
| 2024/0196371 | A1* | 6/2024 | Lauridsen | H04W 68/02 |
| 2025/0158862 | A1* | 5/2025 | Li | H04L 5/0094 |

FOREIGN PATENT DOCUMENTS

| | | | | |
|---|---|---|---|---|
| KR | 10-2103761 | | 4/2020 | |
| WO | WO-2023130276 | A1 * | 7/2023 | H04L 5/00 |

OTHER PUBLICATIONS

Huawei et al., “eDRX for RedCap UE,” R2-2107210, 3GPP TSG-RAN WG2 Meeting #115-e, Electronic, Aug. 2021, 7 pages.

Ericsson, “Details of eDRX and PTW in RRC_IDLE and RRC_INACTIVE,” R2-2108280, 3GPP TSG-RAN WG2 #115-e, Electronic meeting, Aug. 2021, 9 pages.

Huawei et al., “Discussion on Extended DRX enhancements for RedCap UE,” R4-2201190, 3GPP TSG-RAN WG4 Meeting #101-bis-e, Electronic Meeting, Jan. 2022, 15 pages.

Apple, “Discussion on RRM requirement with eDRX for RedCap,” R4-2200295, 3GPP TSG-RAN4 Meeting #101-bis-e, Electronic Meeting, Jan. 2022, 14 pages.

European Patent Office Application Serial No. 23740444.7, Search Report dated Nov. 13, 2025, 9 pages.

* cited by examiner

1

Home Appliance
100e
100f
IoT device
150a
300
150a
Hand-held device
100d
200
150a
400
AI Server/ device
200
Network (5G)
150a
XR device
100c
150a
Robot
100a
150a
200a
200
150c
200
150a
Vehicle
Vehicle
100b-2
150b
100b-1

METHOD AND DEVICE FOR TRANSMITTING AND RECEIVING WIRELESS SIG-NALS IN WIRELESS COMMUNICATION SYSTEM

CROSS-REFERENCE TO RELATED APPLICATION(S)

This application is the National Stage filing under 35 U.S.C. 371 of International Application No. PCT/KR2023/000499, filed on Jan. 11, 2023, which claims the benefit of earlier filing date and right of priority to Korean Application Nos. 10-2022-0004256, filed on Jan. 11, 2022, and 10-2022-0018450, filed on Feb. 11, 2022, the contents of which are all hereby incorporated by reference herein in their entireties.

TECHNICAL FIELD

The present disclosure relates to a wireless communication system, and more particularly, to a method and apparatus for transmitting and receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of receiving a signal by a user equipment (UE) in a wireless communication system. The method may include: receiving configuration information regarding a first signal; receiving a second signal including information regarding the first signal on at least one of time resources determined based on a plurality of periodicities configured in the UE; determining validity of the configuration information regarding the first signal based on the reception of the second signal; and performing an operation related to the first signal based on a determination that the configuration information regarding the first signal is valid. The plurality of periodicities configured in the UE include a first periodicity and a second periodicity having a smaller length than the first periodicity. The UE may determine an interval between time resource groups related to the time resources based on the first periodicity and determine an interval between time resources within each time resource group based on the second periodicity. The UE may determine the validity of the configuration information regarding the first signal based on a location of a time resource on which the second signal is received within a corresponding time resource group.

Based on that the time resource on which the second signal is received within the corresponding time resource group is positioned at a specific location, the UE may determine that the configuration information regarding the first signal is invalid.

Based on that the second signal is received on an initial time resource among time resources included in the corresponding time resource group, the UE may determine that the configuration information regarding the first signal is invalid.

The second signal may include at least one of first information regarding the validity of the configuration information regarding the first signal and second information that instructs to perform the operation related to the first signal.

Preferably, based on that the time resource on which the second signal is received within the corresponding time resource group is positioned at a specific location, the UE may determine that the configuration information regarding the first signal is invalid although the first information included in the second signal indicates that the configuration information regarding the first signal is valid.

Preferably, based on that the time resource on which the second signal is received within the corresponding time resource group is positioned at a specific location, the UE may skip performing the operation related to the first signal indicated by the second information although the second information included in the second signal instructs the UE to perform the operation related to the first signal.

Preferably, based on that the first information indicates that the configuration information regarding the first signal received by the UE is invalid, the UE may skip performing the operation related to the first signal until an update of system information including the configuration information regarding the first signal is completed.

The first periodicity may be related to a paging time window (PTW) cycle of extended discontinuous reception (eDRX), and the second periodicity may be related to a discontinuous reception (DRX) cycle.

The first signal may be a reference signal for a radio resource control (RRC) idle or RRC inactive mode.

The second signal may be a physical downlink control channel (PDCCH) monitored by the UE in the RRC idle or RRC inactive mode.

In another aspect of the present disclosure, provided herein is a computer-readable recording medium having recorded thereon a program for executing the signal reception method described above.

In another aspect of the present disclosure, provided herein is a UE configured to perform the signal reception method described above.

In another aspect of the present disclosure, provided herein is a device configured to control the UE that performs the signal reception method described above.

In another aspect of the present disclosure, provided herein is a method of transmitting a signal by a base station (BS) in a wireless communication system. The method may include: transmitting configuration information regarding a first signal to a UE; and transmitting, to the UE, a second signal including information regarding the first signal on at least one of time resources determined based on a plurality of periodicities. The BS may indicate, to the UE, validity of the configuration information regarding the first signal based on transmitting the second signal. The plurality of periodicities may include a first periodicity and a second periodicity having a smaller length than the first periodicity. An interval between time resource groups related to the time resources may be determined based on the first periodicity, and an interval between time resources within each time resource group may be determined based on the second periodicity. The validity of the configuration information regarding the first signal may be determined based on a location of a time resource on which the second signal is transmitted within a corresponding time resource group.

In a further aspect of the present disclosure, provided herein is a BS configured to perform the signal transmission method described above.

Advantageous Effects

According to an embodiment of the present disclosure, the validity of configuration information regarding a reference signal may be accurately and efficiently determined even in a radio resource control (RRC) idle/inactive mode.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
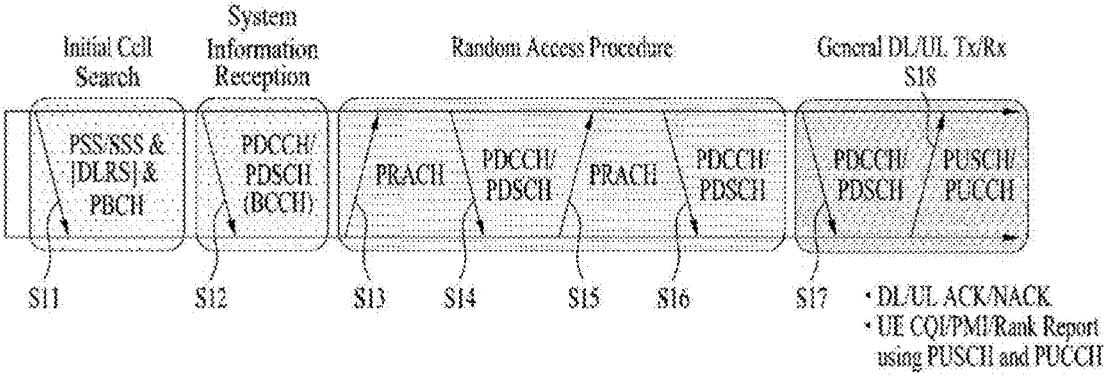
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation

TS 36.212: Multiplexing and channel coding

TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.304: User Equipment (UE) procedures in idle mode and in RRC Inactive state
TS 38.321: Medium Access Control (MAC)
TS 38.331: Radio Resource Control (RRC) protocol specification
TS 37.213: Introduction of channel access procedures to unlicensed spectrum for NR-based access Terms and Abbreviations PSS: Primary Synchronization Signal
SSS: Secondary Synchronization Signal
CRS: Cell reference signal
CSI-RS: Channel State Information Reference Signal
TRS: Tracking Reference Signal
SS: Search Space
CSS: Common Search Space
USS: UE-specific Search Space
PDCCH: Physical Downlink Control Channel; The PDCCH is used to represent PDCCHs of various structures which may be used for the same purpose in the following description.
PO: Paging Occasion
MO: Monitoring Occasion
SI: System Information
PEI: Paging Early Indication
DRX: Discontinuous Reception
eDRX: Extended DRX In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
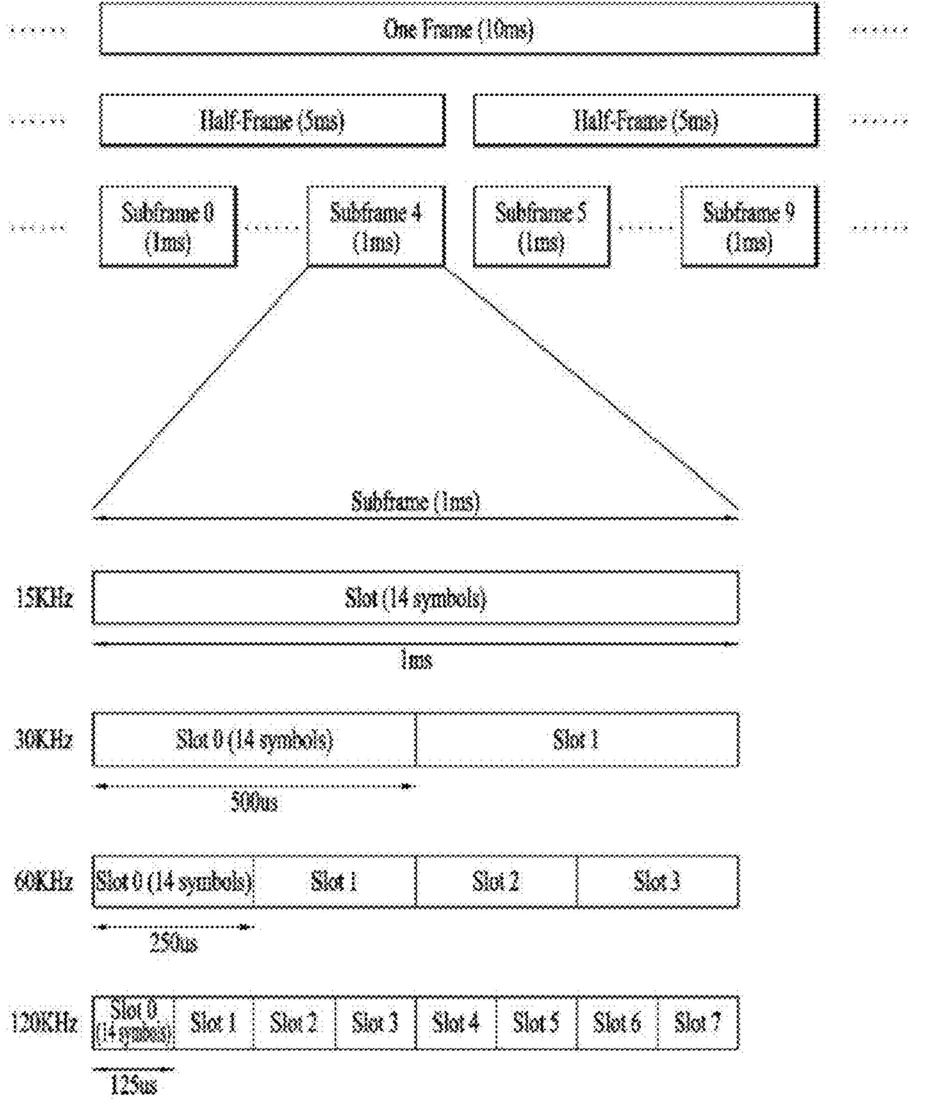
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
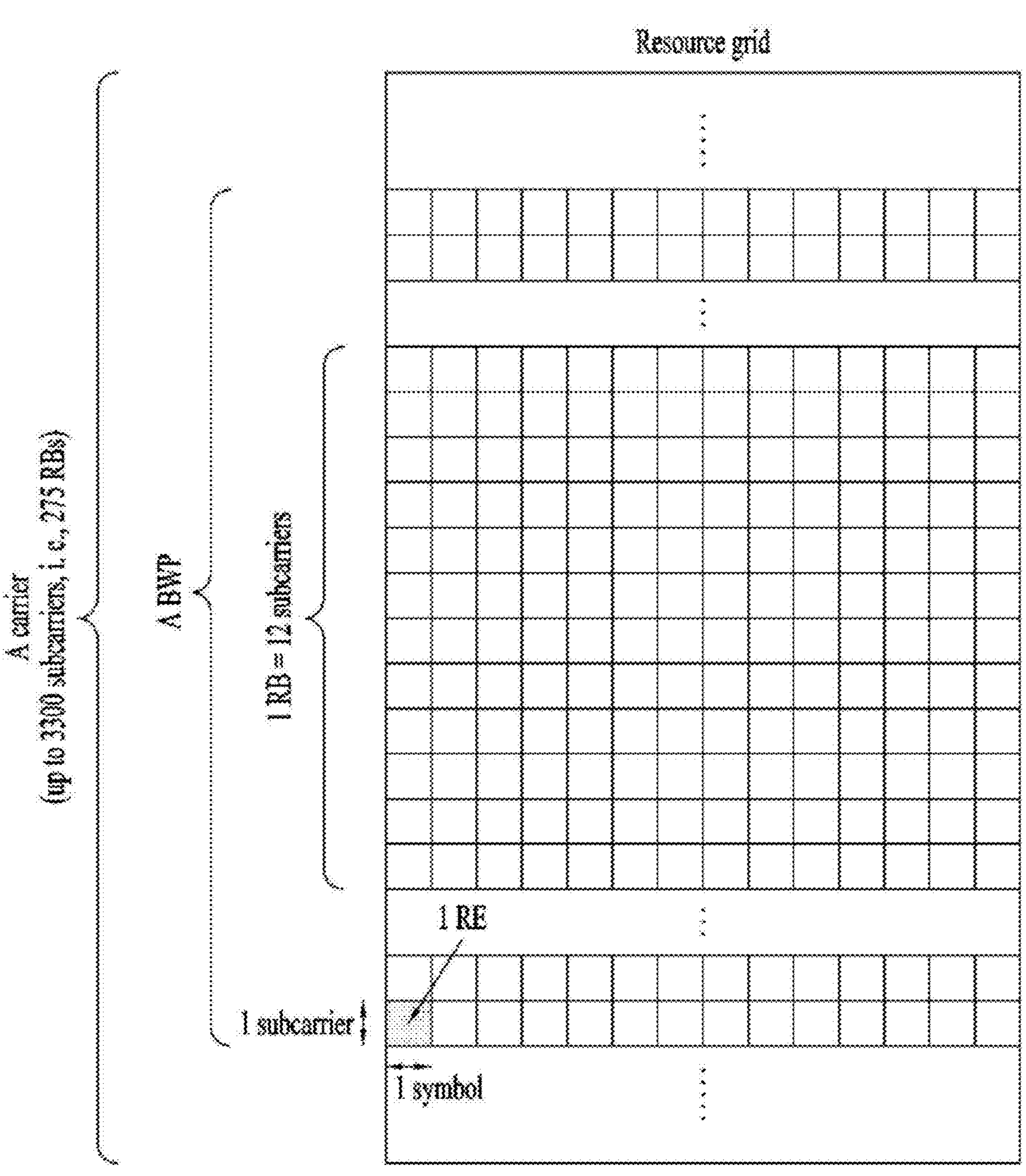
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
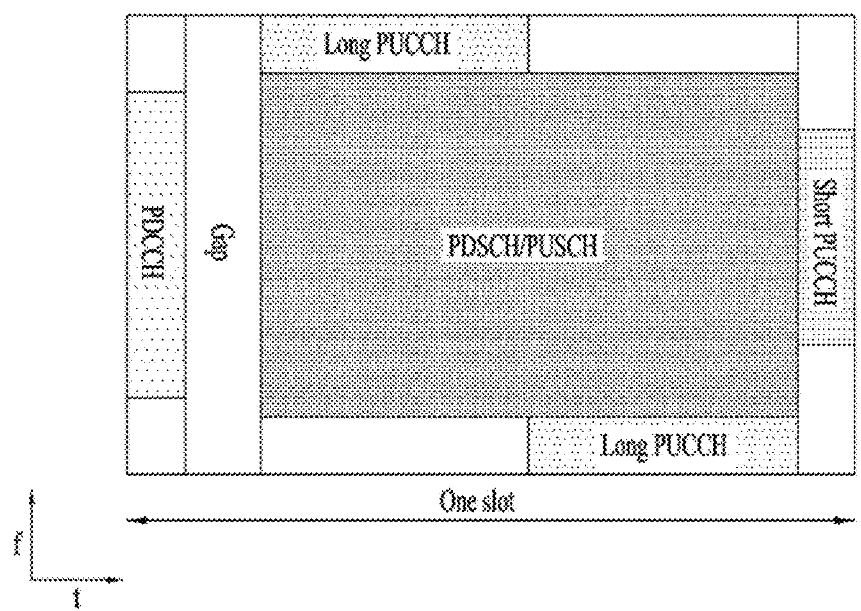
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
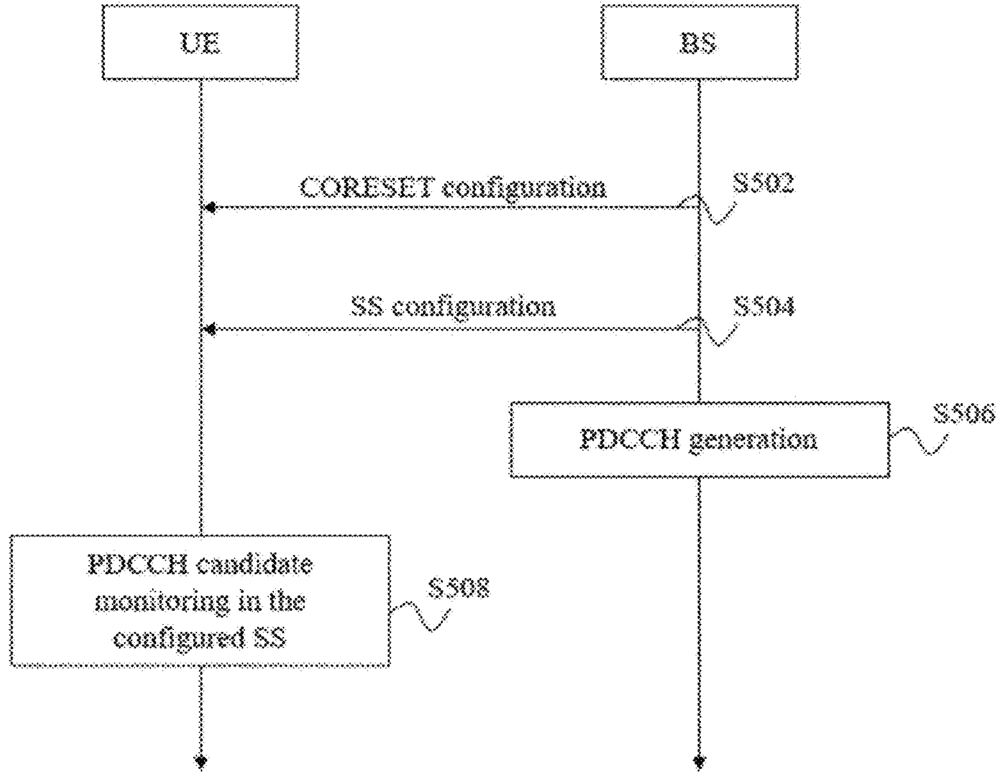
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P) RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. System information (SIB1) broadcast in a cell includes cell-specific PDSCH configuration information, PDSCH-ConfigCommon. PDSCH-ConfigCommon includes a list (or look-up table) of parameters related to a time-domain resource allocation, pdsch-TimeDomainAllocationList. Each pdsch-TimeDomainAllocationList may include up to 16 entries (or rows) each being joint-encoded {K0, PDSCH mapping type, PDSCH start symbol and length (SLIV)}. Aside from (additionally to) pdsch-TimeDomainAllocationList configured through PDSCH-ConfigCommon, pdsch-TimeDomainAllocationList may be provided through a UE-specific PDSCH configuration, PDSCH-Config. pdsch-TimeDomainAllocationList configured UE-specifically has the same structure as pdsch-TimeDomainAllocationList provided UE-commonly. For KO and an SLIV of pdsch-TimeDomainAllocationList, the following description is referred to.

Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The duration has a value between 1 and 3.

cce-REG-MappingType: Indicates a control channel element (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization. When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission configuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS."

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.

controlResourceSetId: Indicates a CORESET associated with the SS.

monitoringSlotPeriodicityAndOffset: Indicates a periodicity (in slots) and offset (in slots) for PDCCH monitoring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candidates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

- Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.
- Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
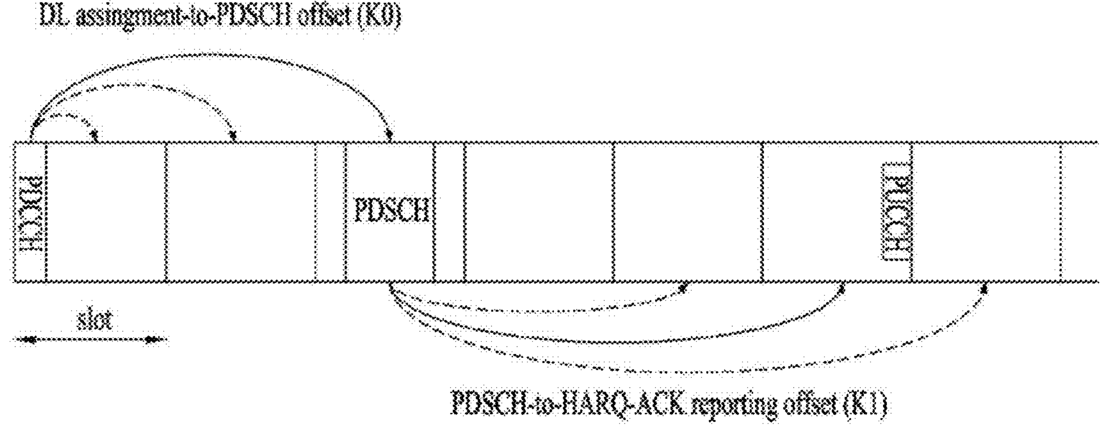
FIG. 6 illustrates an exemplary physical downlink shared channel (PDSCH) reception and acknowledgement/negative acknowledgement (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1), and indicates a DL assignment-to-PDSCH offset, K0 and a PDSCH-HARQ-ACK reporting offset, K1. For example, DCI format 1_0 or DCI format 1_1 may include the following information.

- Frequency domain resource assignment: Indicates an RB set allocated to a PDSCH.
- Time domain resource assignment: Indicates K0 (e.g., slot offset), the starting position (e.g., OFDM symbol index) of the PDSCH in slot #n+K0, and the duration (e.g., the number of OFDM symbols) of the PDSCH. As described above, a row index of pdsch-TimeDomainAllocationList provided UE-commonly or UE-specifically may be indicated by a TDRA field.
- PDSCH-to-HARQ_feedback timing indicator: Indicates K1.
- HARQ process number (4 bits): Indicates the HARQ process ID of data (e.g., a PDSCH or TB).
- PUCCH resource indicator (PRI): Indicates a PUCCH resource to be used for UCI transmission among a plurality of PUCCH resources in a PUCCH resource set.

After receiving a PDSCH in slot # (n+K0) according to the scheduling information of slot #n, the UE may transmit UCI on a PUCCH in slot # (n+K1). The UCI may include an HARQ-ACK response to the PDSCH. FIG. 5 is based on the assumption that the SCS of the PDSCH is equal to the SCS of the PUCCH, and slot #n1=slot # (n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot # (n+K1) is designated as an HARQ-ACK transmission timing for a plurality of PDSCHs, UCI transmitted in slot # (n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCode WordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
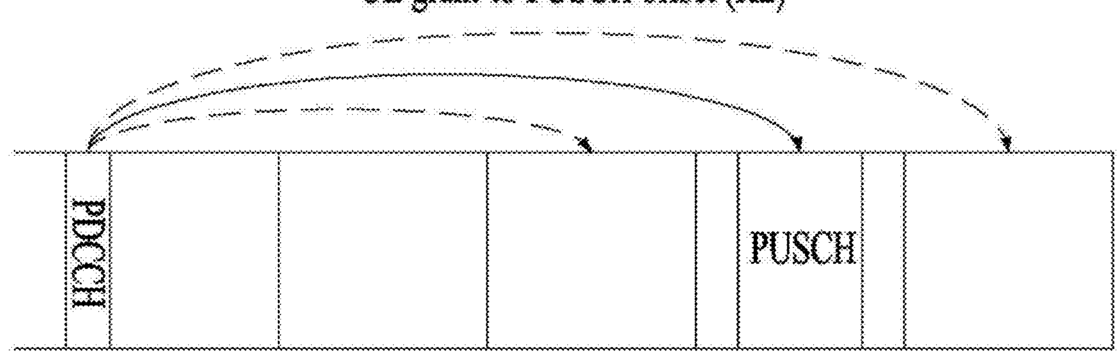
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

- Frequency domain resource assignment: Indicates an RB set assigned to the PUSCH.
- Time domain resource assignment: Indicates a slot offset K2 and the starting position (e.g., OFDM symbol index) and duration (e.g., the number of OFDM symbols) of the PUSCH in a slot. The starting symbol and length of the PUSCH may be indicated by a start and length indicator value (SLIV), or separately.

The UE may then transmit a PUSCH in slot # (n+K2) according to the scheduling information in slot #n. The PUSCH includes a UL-SCH TB.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.
2) In the case of CN-initiated paging, a UE-specific cycle is configured by NAS signaling.
3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each paging occasion (PO) signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner:

An SFN for the PF is determined by:

(SFN+PF_offset) mod T=(T div N)*(UE_ID mod N)

An index i_s indicating the index of the PO is determined by:

i_s=floor (UE_ID/N) mod Ns

The following parameters may be used to calculate the PF and i_s above.

T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).

N: Number of total paging frames in T

Ns: Number of POs for a PF

PF_offset: Offset used for PF determination

UE_ID: 5G-S-TMSI mod 1024

WUS (Wake-up signal)/PEI (Paging Early Indication)

In LTE Rel-15 Narrowband Internet of Things (NB-IoT) and Machine Type Communication (MTC), a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup probability of a UE by using a WUS transmission position and sequence determined based on the UE-group ID of the UE.

Figure 8:
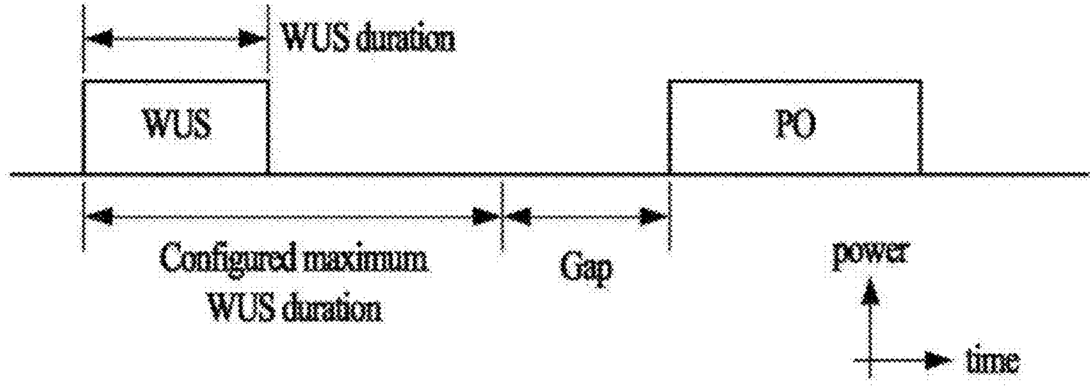
FIG. 8 illustrates a wake-up signal.

FIG. 8 is a diagram illustrating a WUS in an LTE system. Referring to FIG. 8, in MTC and NB-IoT, the WUS may be used to reduce power consumption related to paging monitoring. The WUS is a physical layer signal indicating whether a UE is supposed to monitor a paging signal (e.g., an MPDCCH/NPDCCH scrambled with a P-RNTI) according to a cell configuration. For a UE which is not configured with eDRX (i.e., configured only with DRX), the WUS may be associated with one PO (N=1). On the contrary, for a UE configured with eDRX, the WUS may be associated with one or more POs (N≥1). Upon detection of the WUS, the UE may monitor N POs after being associated with the WUS. When failing to detect the WUS, the UE may maintain sleep mode by skipping PO monitoring until the next WUS monitoring. The UE may receive WUS configuration information from the BS and monitor the WUS based on the WUS configuration information. The WUS configuration information may include, for example, a maximum WUS duration, the number of consecutive POs associated with the WUS, and gap information. The maximum WUS duration may refer to a maximum time period during which the WUS may be transmitted, and may be expressed as a ratio to a maximum repetition number (e.g., Rmax) related to a PDCCH (e.g., MPDCCH or NPDCCH). Although the UE may expect repeated WUS transmissions within the maximum WUS duration, the number of actual WUS transmissions may be less than a maximum number of WUS transmissions within the maximum WUS duration. For example, the number of WUS repetitions may be small for a UE in good coverage. A resource/occasion in which the WUS may be transmitted within the maximum WUS duration is referred to as a WUS resource. The WUS resource may be defined as a plurality of consecutive OFDM symbols by a plurality of consecutive subcarriers. The WUS resource may be defined as a plurality of consecutive OFDM symbols by a plurality of consecutive subcarriers in a subframe or slot. For example, the WUS resource may be defined as 14 consecutive OFDM symbols by 12 consecutive subcarriers.

Upon detection of the WUS, the UE does not monitor the WUS until a first PO associated with the WUS. When the WUS is not detected during the maximum WUS duration, the UE does not monitor a paging signal in POs associated with the WUS (or the UE remains in the sleep mode).

In a communication system such as NR, it may be indicated by a paging early indication (PEI) (e.g., a PEI based on a sequence or DCI) whether the UE should monitor paging DCI in a PO or whether paging DCI is provided. When the UE succeeds in detecting the PEI, the UE monitors the paging DCI (and/or a PDSCH carrying a corresponding paging message). When failing in detecting the PEI, the UE may skip monitoring of the paging DCI in the PO.

DRX (Discontinuous Reception)

(1) RRC_CONNECTED DRX

Figure 9:
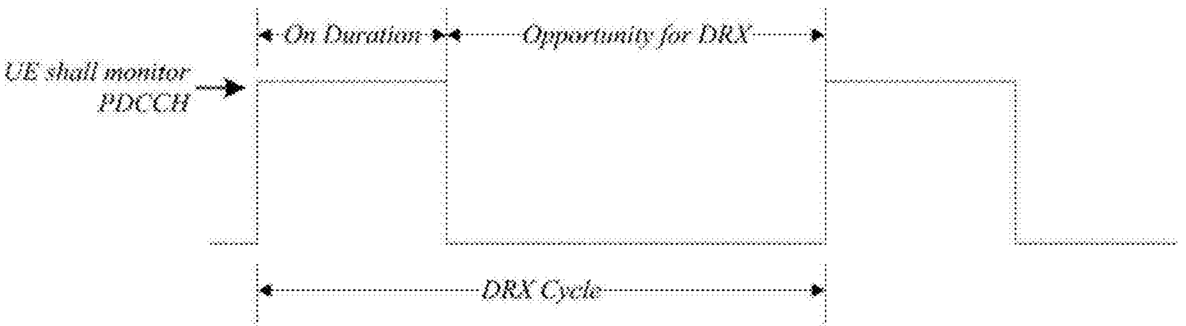
FIGS. 9 to 11 are diagrams for explaining discontinuous reception (DRX) related operations.

FIG. 9 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 9, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 5

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected
- Value of drx-HARQ-RTT-TimerDL: defines the duration of a maximum time period until a DL retransmission is received after reception of a DL initial transmission.
- Value of drx-HARQ-RTT-TimerDL: defines the duration of a maximum time period until a grant for a UL retransmission is received after reception of a grant for a UL initial transmission.
- drx-LongCycleStartOffset: defines the duration and starting time of a DRX cycle.
- drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

RRC_IDLE DRX

In the RRC_IDLE and RRC_INACTIVE states, DRX is used to receive a paging signal discontinuously. For simplicity, DRX performed in the RRC_IDLE (or RRC_INACTIVE) state will be referred to as RRC_IDLE DRX.

Therefore, if DRX is configured, PDCCH monitoring/reception may be performed discontinuously in the time domain in performing the above-described/proposed procedures and/or methods are performed.

Figure 10:
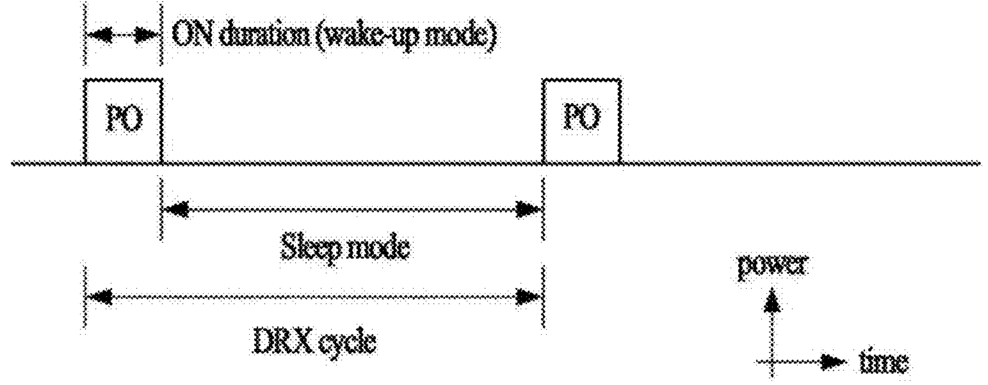

FIG. 10 illustrates an exemplary DRX cycle for paging.

Referring to FIG. 10, DRX may be configured for discontinuous reception of a paging signal. The UE may receive DRX configuration information from the BS by higher-layer (e.g., RRC) signaling. The DRX configuration information may include configuration information related to a DRX cycle, a DRX offset, a DRX timer, and the like. The UE repeats an On duration and a Sleep duration according to the DRX cycle. The UE may operate in a wakeup mode during the On duration and in a sleep mode during the Sleep duration.

In the wakeup mode, the UE may monitor a PO to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) on a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information on a PO, the UE may perform a RACH procedure to initialize (or reconfigure) a connection with the BS, or receive (or obtain) new system information from the BS. Therefore, PO monitoring may be performed discontinuously in the time domain to perform a RACH procedure for connection to the BS or to receive (or obtain) new system information from the BS in the above-described procedures and/or methods.

Figure 11:
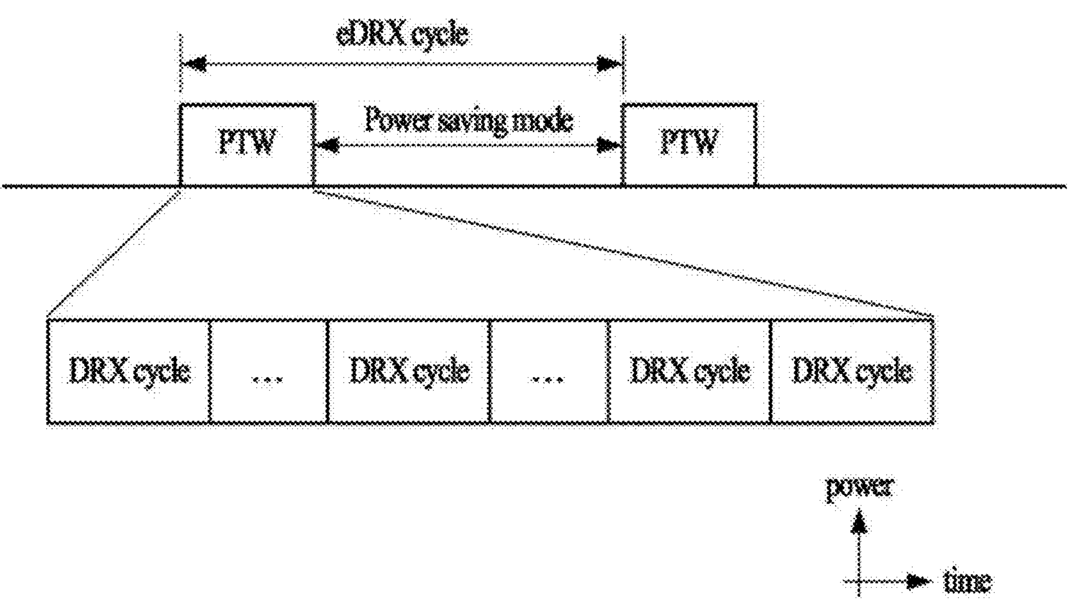

FIG. 11 illustrates an extended DRX (eDRX) cycle.

According to the DRX cycle configuration, the maximum cycle duration may be limited to 2.56 seconds. However, in the case of a UE that intermittently performs data transmission/reception, such as an MTC UE or an NB-IoT UE, unnecessary power consumption may occur during the DRX cycle. In order to further reduce the power consumption of the UE, a method of significantly extending the DRX cycle based on a power saving mode (PSM) and a paging time window or paging transmission window (PTW) has been introduced. The extended DRX cycle is simply referred to as an eDRX cycle. Specifically, paging hyper-frames (PHs) are periodically configured based on the UE ID, and a PTW is defined in the PHs. The UE may perform a DRX cycle in the PTW duration to switch to the wakeup mode on the PO thereof to monitor the paging signal. One or more DRX cycles (e.g., wake-up mode and sleep mode) of FIG. 10 may be included in the PTW duration. The number of DRX cycles in the PTW duration may be set by the BS through a higher layer (e.g., RRC) signal.

Configured Information Validity

In a wireless communication system, SI (system information) is downlink broadcast information transmitted by the BS, which is essential information provided to the UE for establishing a connection with the BS. For example, in 3GPP-based wireless communication systems such as LTE and NR, the BS may transmit SI periodically or upon a request from the UE (i.e., on-demand manner). The UE may receive the SI and perform operations such as paging, RACH, and/or cell measurement based on the acquired information. If the information in the SI is changed, an appropriate procedure needs to be defined for the UE to receive the changed information and reflect the changed SI in order to support the UE to establish a connection with the BS. For example, in 3GPP-based wireless communication systems such as LTE and NR, methods are defined to periodically inform UEs in the RRC idle/inactive state of changes in SI through paging, which is periodically monitored by the UEs, and to allow the UEs to perform SI updates.

However, the existing SI change indication and update procedure may not be suitable in the following situations. If the UE performs sparse reception of a control channel signaling the SI change indication, the UE may receive the SI change indication after SI is already changed as the monitoring duration of the control channel increases. For example, in 3GPP-based wireless communication systems such as LTE and NR, when the eDRX structure is used, a paging occasion (PO) where the UE is capable of receiving the SI change indication may occur at intervals of up to approximately 3 hours, which may cause delays in the reception of the SI change indication by the UE. In particular, when the UE receives the changed SI through paging, the UE may receive the paging before performing the SI update procedure. As a result, there may be a problem of inconsistency in the information between the BS and UE.

Hereinafter, provided are methods for preventing malfunctions that may occur when the UE fails to recognize changes in SI and/or methods for enhancing the availability of information based on the status of SI changes when the DRX/eDRX structure is used where the UE periodically monitors a control channel and receives an SI change indication by monitoring the control channel.

For example, in 3GPP wireless communication systems such as LTE and NR, SI may be transmitted over a PDSCH carrying a PBCH and SIB. In this specification, a block for SI exchanged between the BS and UE is defined as an SIB. However, the proposals of the present disclosure are not limited to the term "SIB", and the proposals may be applied to other signals/channels with different names on which SI is transmitted.

The following methods may operate independently without any separate combinations, or the methods may be combined in various ways and operate in a coordinated manner. Some of the terms, symbols, and orders used herein to describe the present disclosure may be replaced with other terms, symbols, and orders as long as the principles of the present disclosure are maintained. The proposed methods may be applied to various wireless communications including NR even without specific descriptions.

Provision of Validity of Information Based on Same Control Channel

In the following, a scenario is considered where the UE receives and stores configuration information containing specific information (hereinafter referred to as information A) through a specific SIB (hereinafter referred to as SIB-A) and expects that operations related to information A will be provided over a specific control channel (hereinafter referred to as control channel A).

If the UE successfully monitors and receives control channel A, the UE may obtain a change indicator that enable the UE to validate information A from control channel A (along with information A).

In this case, the change indicator may refer to information capable of being used by the UE to determine whether the configuration of information A is modified. For instance, when the UE stores information A and knows the state of a change indicator (e.g., a value represented by a bit string) corresponding to stored information A, if the state of the stored change indicator is equal to the state of a newly received change indicator, the UE may assume that the configuration of stored information A is valid. If the state of the stored change indicator differs from the state of the newly received change indicator, the UE may assume that the configuration of stored information A is not valid.

If the UE is capable of assuming that the configuration of information A is valid, the UE may perform operations related to information A indicated by received control channel A. If the UE is incapable of assuming that the configuration of information A is valid, the UE may not perform operations related to information A indicated by received control channel A.

For example, in 3GPP-based wireless communication systems such as LTE and NR, control channel A may be a PDCCH where paging DCI is transmitted (hereinafter referred to as a P-PDCCH). Information A may be configuration information regarding TRS resource(s) where idle/inactive UEs are capable of assuming transmission. In this case, information A provided over a P-PDCCH may be information indicating whether TRS transmission on the TRS resource(s) configured to the UE is valid (hereinafter referred to as TRS validity information). In addition, the paging DCI may include a change indicator for determining the validity of TRS resource configuration information. When such a method is used, the UE may receive configuration information regarding the TRS resource(s) through SIB-A and store the configuration information. Subsequently, the UE periodically monitors a PO. If the UE successfully detects the paging DCI, the UE may check the change indicator along with the TRS validity information from the received paging DCI. If the value of the received change indicator is the same as that of a change indicator previously detected by the UE, the UE may perform valid TRS-related operations indicated by the received paging DCI. In this case, if the validity duration of the TRS validity information previously indicated to the UE is still valid (e.g., not expired), the UE may assume that the validity duration of the TRS validity information indicated at the previous instance will be maintained. If the value of the newly received change indicator differs from that of the change indicator previously detected by the UE, the UE may not perform the TRS-related operations indicated by the received paging DCI. In this case, if the validity duration of the TRS validity information previously indicated to the UE is still valid, the UE may assume that the validity duration of the TRS validity information instructed at the previous instance will be maintained.

As another example, in 3GPP-based wireless communication systems such as LTE and NR, control channel A may be a PDCCH where PEI DCI is transmitted (hereinafter referred to as a PEI-PDCCH). Information A may be configuration information regarding TRS resource(s) where idle/inactive UEs are capable of assuming transmission. In this case, information A provided over a PEI-PDCCH may be information indicating whether TRS transmission on the TRS resource(s) configured to the UE is valid (hereinafter referred to as TRS validity information). In addition, the PEI DCI may include a change indicator for determining the validity of TRS resource configuration information. When such a method is used, the UE may receive configuration information regarding TRS resources through SIB-A and store the configuration information. When such a method is used, the UE may receive configuration information regarding the TRS resource(s) through SIB-A and store the configuration information. Subsequently, the UE periodically monitors a PEI occasion. If the UE successfully detects the PEI DCI, the UE may check the change indicator along with the TRS validity information from the received PEI DCI. If the value of the received change indicator is the same as that of a change indicator previously detected by the UE, the UE may perform valid TRS-related operations indicated by the received PEI DCI. In this case, if the validity duration of the TRS validity information previously indicated to the UE is still valid, the UE may assume that the validity duration of the TRS validity information indicated at the previous instance will be maintained. If the value of the newly received change indicator differs from that of the change indicator previously detected by the UE, the UE may not perform the TRS-related operations indicated by the received PEI DCI. In this case, if the validity duration of the TRS validity information previously indicated to the UE is still valid, the UE may assume that the validity duration of the TRS validity information instructed at the previous instance will be maintained. In this case, even if the validity duration of the previously indicated TRS validity information does not end yet, the UE can assume that the validity duration of the previously indicated TRS validity information is no longer valid.

As a further example, in 3GPP-based wireless communication systems such as LTE and NR, control channel A may be a PDCCH where PEI DCI is transmitted (hereinafter referred to as a PEI-PDCCH). Information A may be a UE group/subgroup indication for providing information regarding a UE PO index and a UE subgroup index. In this case, information A provided over a PEI-PDCCH may be information regarding a PEI for the UE (e.g., information regarding whether the UE needs to perform monitoring at the location of a designated PO). In addition, the PEI DCI may include a change indicator for determining the validity of the PEI information. When such a method is used, the UE may receive configuration information regarding the UE group/subgroup indication through SIB-A and store the configuration information. Subsequently, the UE periodically monitors a PEI occasion. If the UE successfully detects the PEI DCI, the UE may check the change indicator along with the PEI information from the received PEI DCI. If the value of the received change indicator is the same as that of a change indicator previously detected by the UE, the UE may perform PEI operations indicated by the received PEI DCI. If the value of the received change indicator differs from that of the change indicator previously detected by the UE, the UE may assume that the information provided by the PEI is not valid and then stop monitoring the PEI, which means that the UE monitors a PO regardless of the information provided by the PEI (or skips monitoring the PO).

Figure 12:
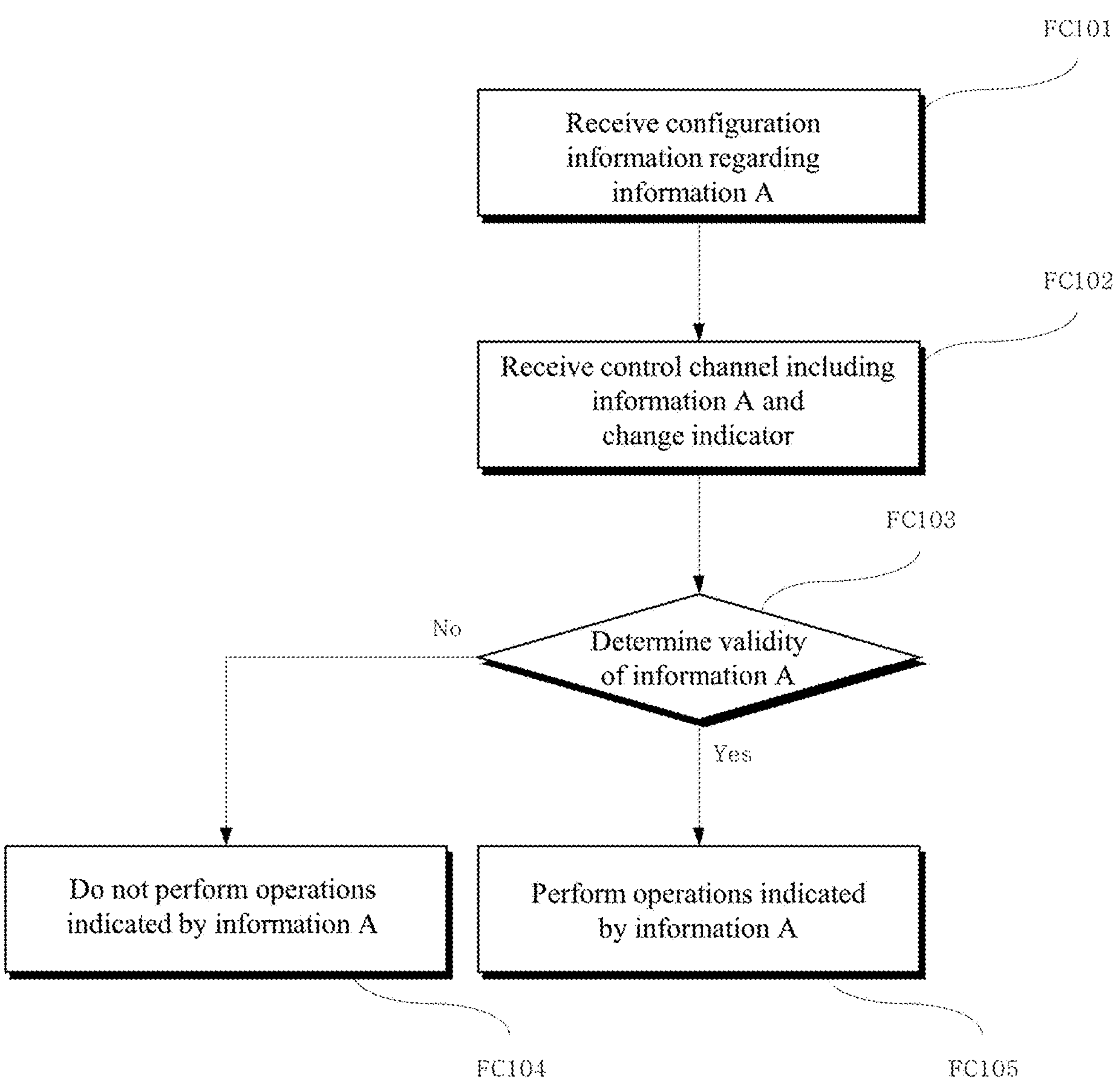
FIG. 12 illustrates exemplary user equipment (UE) operations.

FIG. 12 illustrates exemplary UE operations.

Referring to FIG. 12, the UE may receive configuration information including information A from the BS (FC101). For example, the configuration information may be received through a higher layer signal (e.g., SIB or RRC signaling). In this case, the UE may determine the state of a change indicator based on received information A. If the configuration information regarding received information A is the same as configuration information stored in the UE, the UE may expect that a previous change indicator will be maintained. If the configuration information regarding received information A differs from the configuration information stored in the UE, the UE may expect that the previous change indicator will be modified. If the UE does not receive new information A, the UE may assume that the previous change indicator will be maintained. If there is no configuration information regarding information A stored by the UE or if the UE never receives any change indicator, the UE may determine that the value of a first change indicator to be received is always valid.

The UE may receive a change indicator corresponding to information A along with an indication for operations related to information A over a control channel on which information A is transmitted (FC102).

Subsequently, if the UE successfully receives the control channel, the UE may determine the validity of information A based on the change indicator (FC103).

If it is determined by the received change indicator that information A is valid, the UE may perform the operations related to information A indicated over the control channel where the change indicator is received (FC105).

If it is determined by the received change indicator that information A is not valid, the UE may not perform the operations related to information A indicated over the control channel where the change indicator is received (FC104).

On the other hand, the BS may transmit configuration information including specific information (hereinafter referred to as information A) through a specific SIB (hereinafter referred to as SIB-A).

When transmitting a specific control channel (hereinafter referred to as control channel A), the BS may transmit a change indicator capable of determining the validity of information A along with information indicating operations related to information A over control channel A.

In this case, the change indicator may be information used to inform the UE whether the configuration of information A is changed or not. For example, when there is information A previously transmitted by the BS and when the state of a change indicator (e.g., a value represented by a bit string) corresponding to information A transmitted by the BS is already transmitted, if previously transmitted information A is maintained at the timing of transmitting control channel A, the BS may determine to transmit control channel A by maintaining the state of the previously transmitted change indicator. If previously transmitted information A is changed (or is supposed to be changed) at the time of transmitting information A, the BS may transmit control channel A including a change indicator with a state different from a previously transmitted state (e.g., a bit string with a different value).

The criterion for determining the state of the change indicator may be whether the BS updates SIB-A and provides the UE with information regarding changes in information A. For example, a point in time at which the value of the change indicator is applied may be determined as either a point in time at which SIB-A containing changed information A is initially transmitted or the beginning of a modification period including the point in time.

For example, in 3GPP-based wireless communication systems such as LTE and NR, control channel A may be a PDCCH where paging DCI is transmitted (hereinafter referred to as a P-PDCCH). Information A may be configuration information regarding TRS resource(s) where idle/inactive UEs are capable of assuming transmission. In this case, information A provided over a P-PDCCH may be information indicating whether TRS transmission on the TRS resource(s) configured to the UE is valid (hereinafter referred to as TRS validity information). In addition, the paging DCI may include a change indicator for determining the validity of TRS resource configuration information. When such a method is used, the BS may provide the UE with configuration information regarding the TRS resource(s) through SIB-A. Subsequently, the BS may transmit the paging DCI including the change indicator along with TRS validity information at the location of a PO. If the configuration information regarding SIB-A is maintained, the BS may use the same value as that of a previously transmitted change indicator to transmit the paging DCI. If the configuration information regarding SIB-A is changed, the BS may select a different value from that of the previously transmitted change indicator to transmit the paging DCI.

As another example, in 3GPP-based wireless communication systems such as LTE and NR, control channel A may be a PDCCH where PEI DCI is transmitted (hereinafter referred to as a PEI-PDCCH). Information A may be configuration information regarding TRS resource(s) where idle/inactive UEs are capable of assuming transmission. In this case, information A provided over a PEI-PDCCH may be information indicating whether TRS transmission on the TRS resource(s) configured to the UE is valid (hereinafter referred to as TRS validity information). In addition, the PEI DCI may include a change indicator for determining the validity of TRS resource configuration information. When such a method is used, the BS may provide the UE with configuration information regarding the TRS resource(s) through SIB-A. Subsequently, the BS may transmit the PEI DCI including the change indicator along with TRS validity information at the location of a PEI occasion. If the configuration information regarding SIB-A is maintained, the BS may use the same value as that of a previously transmitted change indicator to transmit the PEI DCI. If the configuration information regarding SIB-A is changed, the BS may select a different value from that of the previously transmitted change indicator to transmit the PEI DCI.

As a further example, in 3GPP-based wireless communication systems such as LTE and NR, control channel A may be a PDCCH where PEI DCI is transmitted (hereinafter referred to as a PEI-PDCCH). Information A may be a UE group/subgroup indication for providing information regarding a UE PO index and a UE subgroup index. In this case, information A provided over a PEI-PDCCH may be information regarding a PEI for the UE (e.g., information regarding whether the UE needs to perform monitoring at the location of a designated PO). In addition, the PEI DCI may include a change indicator for determining the validity of the PEI information. When such a method is used, the BS may provide the UE with configuration information regarding the UE group/subgroup indication through SIB-A. Subsequently, the BS may transmit the PEI DCI including the change indicator along with the PEI information at the location of a PEI occasion. If the configuration information regarding SIB-A is maintained, the BS may use the same value as that of a previously transmitted change indicator to transmit the PEI DCI. If the configuration information regarding SIB-A is changed, the BS may select a different value from that of the previously transmitted change indicator to transmit the PEI DCI.

Figure 13:
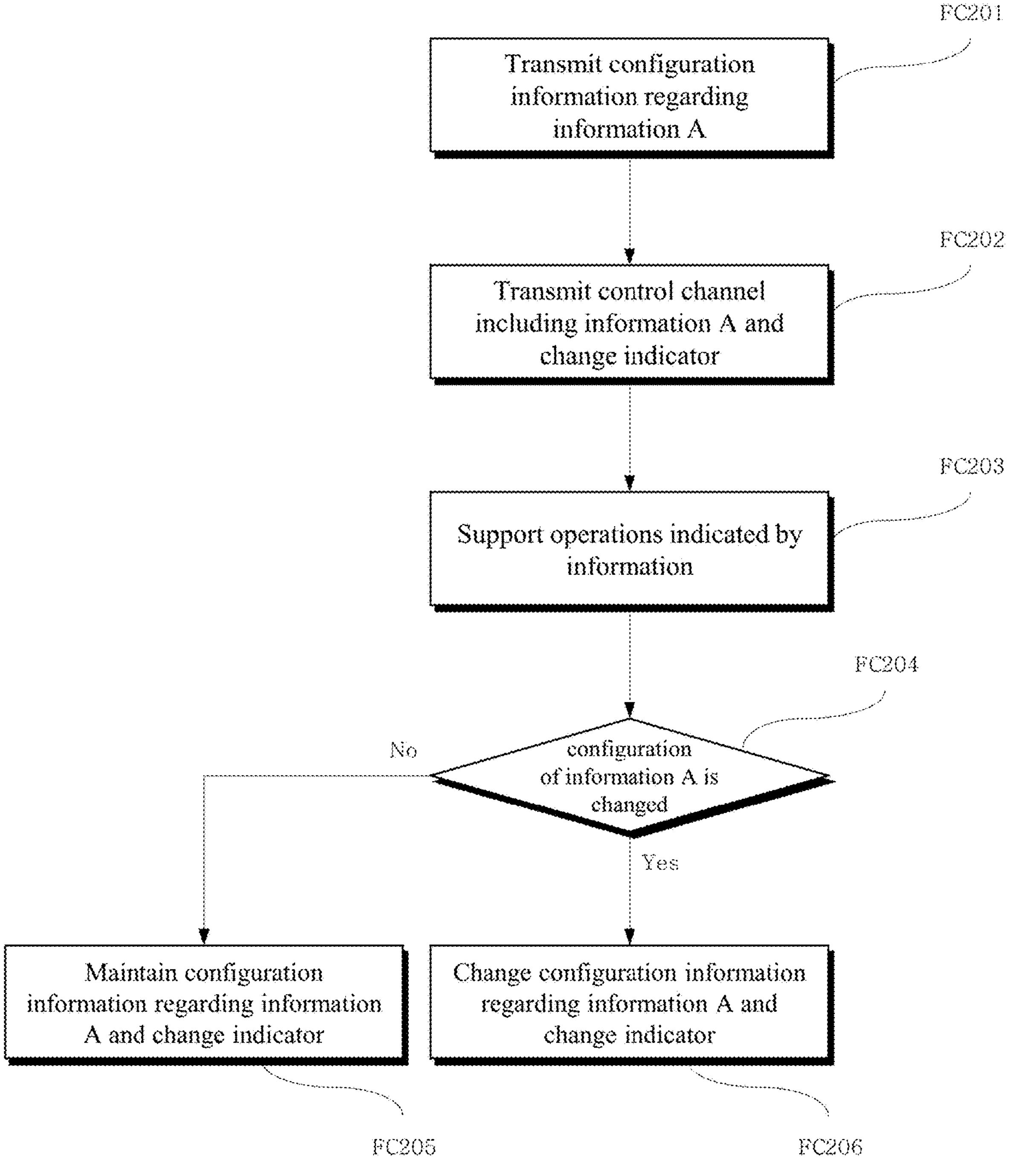
FIG. 13 illustrates exemplary base station (BS) operations.

FIG. 13 illustrates exemplary BS operations.

Referring to FIG. 13, the BS may generate and transmit configuration information including information A (FC201). For example, the configuration information may be transmitted through higher layer signaling (e.g., SIB or RRC signaling).

Subsequently, if there is control channel A that the BS desires to transmit, the BS may transmit a change indicator corresponding to information A along with an indication for operations related to information A over control channel A (FC202).

In this case, if the BS indicates the operations related to information A over control channel A, the BS may support the related operations according to the transmitted information (FC203).

Thereafter, if the BS intends to maintain configuration information regarding information A (FC204), the BS may provide the same information in providing the configuration information regarding information A. In addition, the BS may also maintain the value of the change indicator transmitted over control channel A (FC205).

If the BS intends to modify the configuration information regarding information A (FC204), the BS may provide modified information in providing the configuration information regarding information A. In addition, the BS may also modify the value of the change indicator transmitted over control channel A (FC206).

For example, the eDRX structure where the UE monitors a PO at a relatively long cycle may be considered. When the UE has a general DRX cycle, the UE may acquire SI stably by receiving SI update information and applying a modification period to apply the SI update information. On the other hand, when the UE has an eDRX cycle, the UE may maintain a sleep state for a period longer than the modification period (i.e., a state in which the UE does not monitor POs). During the period in which the UE maintains the sleep state, there is a possibility that if an SI update occurs, the UE may perform PO monitoring without reflecting the updated SI. For power saving enhancement operations planned for idle/inactive UEs in Rel-17 NR (e.g., UE group/subgroup indication based on PEI and TRS availability indication based on PEI and paging), operations are instructed via L1 signaling (e.g., paging DCI or PEI) which is received during the paging procedure of the UE. Therefore, when if it is difficult for the UE accurately update information received on a PO or PEI occasion, it may lead to malfunctions in the UE, potentially resulting in performance degradation such as paging reception failure. When the proposed methods are used, the UE may prevent malfunctions by determining the validity of the configuration of operations instructed over a control channel where the Rel-17 NR power saving enhancement operations are instructed. Additionally, since UE does not need to acquire separate signaling therefor, the UE may prevent unnecessary signaling overhead and reduce UE power consumption.

If the previously indicated TRS availability is no longer available due to changes in the TRS configuration while the UE having the eDRX cycle remains in the sleep state, the UE may prevent issues with time/frequency synchronization errors that may arise when the UE assumes the TRS availability whose support is ended/changed.

Provision of Validity of Information Based on SI Acquisition Procedure

In the following, a scenario is considered where the UE receives and stores a configuration containing specific information (hereinafter referred to as information A) through a specific SIB (hereinafter referred to as SIB-A) and expects that operations related to information A will be provided over a specific control channel (hereinafter referred to as control channel A). In addition, a scenario is considered where an essential SIB (hereinafter referred to as SIB-B), which the UE needs to obtain periodically to maintain a connection with the network, is periodically transmitted by the BS.

The UE may receive SIB-B (and/or a control channel scheduling SIB-B) (hereafter referred to as control channel B) before monitoring control channel A. The UE may receive a change indicator for determining the validity of information A through received SIB-B (or control channel B).

In this case, the change indicator may refer to information capable of being used by the UE to determine whether the configuration of information A is modified. For instance, when the UE stores information A and knows the state of a change indicator (e.g., a value represented by a bit string) corresponding to stored information A, if the state of the stored change indicator is equal to the state of a newly received change indicator, the UE may assume that the configuration of stored information A is valid. If the state of the stored change indicator differs from the state of the newly received change indicator, the UE may assume that the configuration of stored information A is not valid. If the UE is capable of assuming that the configuration of information A is valid, the UE may perform operations related to information A indicated by received control channel A. If the UE is incapable of assuming that the configuration of information A is valid, the UE may not perform operations related to information A indicated by received control channel A.

If the UE intentionally does not receive SIB-B (or control channel B) or does not need to receive SIB-B (or control channel B), the UE may assume that the configuration of information A stored in the UE is valid without verifying the change indicator.

If the UE successfully monitors and receives control channel A while assuming that information A is valid, the UE may perform the operations related to information A indicated by received control channel A. If the UE successfully monitors and receives control channel A without assuming that information A is valid, the UE may not perform the operations related to information A indicated by received control channel A.

For example, in 3GPP-based wireless communication systems such as LTE and NR. Control channel A may be a PDCCH where paging DCI is transmitted (hereinafter referred to as a P-PDCCH). Information A may be configuration information regarding TRS resource(s) where idle/inactive UEs are capable of assuming transmission. SIB-B may be an SIB including remaining system information (RMSI), and Control Channel B may be a PDCCH scheduling a PDSCH for transmission of SIB1 (hereinafter referred to as an SIB1-PDCCH). In this case, information A provided over a P-PDCCH may be information indicating whether TRS transmission on the TRS resource(s) configured to the UE is valid (hereinafter referred to as TRS validity information). In addition, SIB1 may include a change indicator for determining the validity of TRS resource configuration information. When such a method is used, the UE may receive configuration information regarding the TRS resource(s) through SIB-A and store the configuration information. In addition, the UE may receive and store information regarding a change indicator for the stored TRS resource(s) via SIB1 (or SIB1-PDCCH). In this case, if the validity duration of the TRS validity information previously indicated to the UE is still valid, the UE may not assume TRS transmission within the validity duration of the previously indicated TRS validity information from a reference point in time (e.g., a location where the last PO is checked or a location where the configuration of SIB1/SIB-X is received) to the current point in time of receiving SIB-A. Subsequently, the UE may check that the change indicator is maintained through the reception of SIB1 (or SIB1-PDCCH). Alternatively, if the UE intentionally does not receive SIB1 (or SIB1-PDCCH) or does not need to receive SIB1 (or SIB1-PDCCH), the UE may assume that the TRS resource configuration information stored in the UE is valid. In this case, if the validity duration of the TRS validity information previously indicated to the UE is still remaining, the UE may assume that the validity duration of the previously indicated TRS validity information will be maintained. While assuming that the TRS resource configuration information stored in the UE is valid, the UE may monitor a PO. If the UE successfully detects the paging DCI, the UE may check the TRS validity information from the received paging DCI and then perform indicated valid TRS-related operations. If the UE detects changes in the change indicator through the reception of SIB1 (or SIB1-PDCCH), the UE may assume that the stored TRS resource configuration information is not valid. In this case, if the validity duration of the previously indicated TRS validity information is still remaining, the UE may assume that the validity duration of the previously indicated TRS validity information is no longer valid. While assuming that the stored TRS resource configuration information is not valid, even if the UE monitors the PO and successfully detects the paging DCI, the UE may not perform operations related to the TRS validity information indicated by the paging DCI.

As another example, in 3GPP-based wireless communication systems such as LTE and NR, control channel A may be a PDCCH where PEI DCI is transmitted (hereinafter referred to as a PEI-PDCCH). Information A may be configuration information regarding TRS resource(s) where idle/inactive UEs are capable of assuming transmission. SIB-B may be an SIB carrying RMSI, and Control Channel B may be a PDCCH scheduling a PDSCH for transmission of SIB1 (hereinafter referred to as an SIB1-PDCCH). In this case, information A provided over a PEI-PDCCH may be information indicating whether TRS transmission on the TRS resource(s) configured to the UE is valid (hereinafter referred to as TRS validity information). In addition, SIB1 (or SIB1-PDCCH) may include a change indicator for determining the validity of TRS resource configuration information. When such a method is used, the UE may receive configuration information regarding the TRS resource(s) through SIB-A and store the configuration information. In addition, the UE may receive and store information regarding a change indicator for the stored TRS resource(s) via SIB1 (or SIB1-PDCCH). Subsequently, the UE may check that the change indicator is maintained through the reception of SIB1 (or SIB1-PDCCH). Alternatively, if the UE intentionally does not receive SIB1 (or SIB1-PDCCH) or does not need to receive SIB1 (or SIB1-PDCCH), the UE may assume that the TRS resource configuration information stored in the UE is valid. In this case, if the validity duration of the TRS validity information previously indicated to the UE is still remaining, the UE may assume that the validity duration of the previously indicated TRS validity information will be maintained. While assuming that the TRS resource configuration information stored in the UE is valid, the UE may monitor a PEI occasion. If the UE successfully detects the PEI DCI, the UE may check the TRS validity information from the received PEI DCI and then perform indicated valid TRS-related operations. If the UE detects changes in the change indicator through the reception of SIB1 (or SIB1-PDCCH), the UE may assume that the stored TRS resource configuration information is not valid. In this case, if the validity duration of the previously indicated TRS validity information is still remaining, the UE may assume that the validity duration of the previously indicated TRS validity information is no longer valid. While assuming that the stored TRS resource configuration information is not valid, even if the UE monitors the PEI occasion and successfully detects the PEI DCI, the UE may not perform operations related to the TRS validity information indicated by the PEI DCI.

Figure 14:
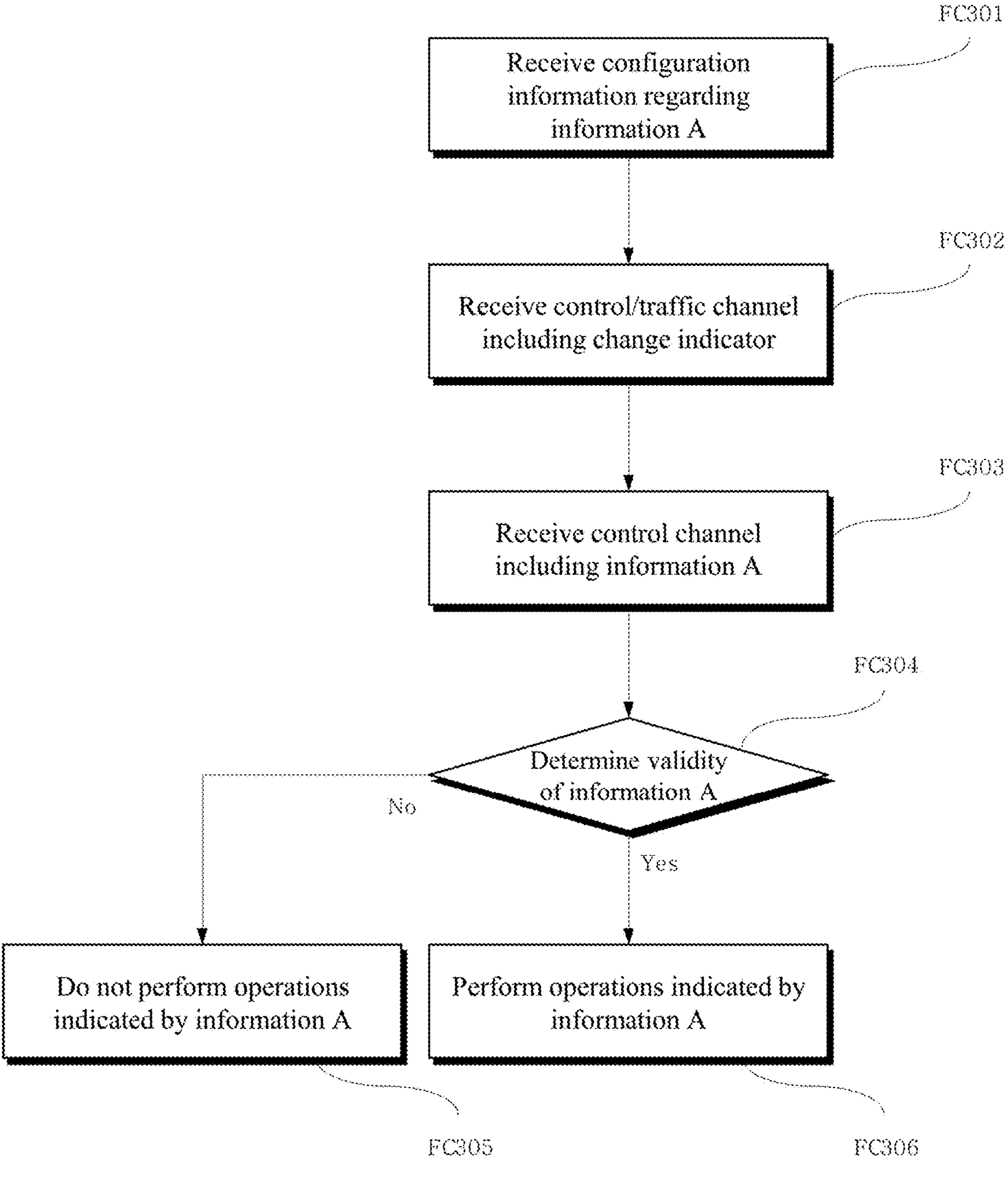
FIG. 14 illustrates exemplary UE operations.

FIG. 14 illustrates exemplary UE operations.

Referring to FIG. 12, the UE may receive configuration information including information A from the BS (FC301). For example, the configuration information may be received through a higher layer signal (e.g., SIB or RRC signaling).

The UE may receive and store configuration information including a change indicator for information A over a control or traffic channel transmitted from the BS, and in this case, the UE may expect that the operations proposed in the present disclosure will be supported (FC302). For example, when a control channel is used, the configuration information may be received over a physical layer channel (e.g., PDCCH) scheduling a higher layer signal. When a traffic channel is used, the configuration information may be received though a higher layer signal (e.g., SIB or RRC signaling).

Subsequently, the UE may receive an indication regarding operations related to received information A over a control channel where information A is transmitted (FC303).

In this case, if the UE determines that information A stored in the UE is valid based on the change indicator received in step FC302, the UE may perform the operations related to information A indicated over the control channel received in step FC303 (FC306).

In this case, if the UE determines that information A stored in the UE is invalid based on the change indicator received in step FC302, The UE may not perform the operations related to information A indicated over the control channel received in step FC303 (FC305).

The BS may transmit configuration information for specific information (hereinafter referred to as information A) through a specific SIB (hereinafter referred to as SIB-B). A scenario is considered where the BS periodically transmits an essential SIB (hereinafter referred to as SIB-B), which the UE needs to obtain periodically (or conditionally) to maintain a connection with the network.

The BS may also transmit a change indicator for determining the validity of information A through SIB-B (or a control channel scheduling SIB-B, hereinafter referred to as control channel B).

In this case, the change indicator may be information used to inform the UE whether the configuration of information A is changed or not. For example, when there is information A previously transmitted by the BS and when the state of a change indicator (e.g., a value represented by a bit string) corresponding to information A transmitted by the BS is already transmitted, if previously transmitted information A is maintained at the time of transmitting SIB-B (or control channel B), the BS may determine to transmit SIB-B (or control channel B) by maintaining the state of the previously transmitted change indicator. If previously transmitted SIB-B (or control channel B) is changed (or is supposed to be changed) at the time of transmitting SIB-B (or control channel B), the BS may transmit SIB-B (or control channel B) including a change indicator with a state different from a previously transmitted state (e.g., a bit string with a different value).

The criterion for determining the state of the change indicator may be whether the BS updates SIB-B and provides the UE with information regarding changes in information A. For example, a point in time at which the value of the change indicator is applied may be determined as either a point in time at which SIB-B containing changed information A is initially transmitted or the beginning of a modification period including the point in time.

The BS may transmit a specific control channel (hereinafter referred to as control channel A) for providing operations indicated by information A and then support the operations for information A transmitted over control channel A.

For example, in 3GPP-based wireless communication systems such as LTE and NR, control channel A may be a PDCCH where paging DCI is transmitted (hereinafter referred to as a P-PDCCH). Information A may be configuration information regarding TRS resource(s) where idle/inactive UEs are capable of assuming transmission. SIB-B may be SIB1 carrying RMSI, and Control Channel B may be a PDCCH scheduling a PDSCH for transmission of SIB1 (hereinafter referred to as an SIB1-PDCCH). In this case, information A provided over a P-PDCCH may be information indicating whether TRS transmission on the TRS resource(s) configured to the UE is valid (hereinafter referred to as TRS validity information). In addition, SIB1 may include a change indicator for determining the validity of TRS resource configuration information. When such a method is used, the BS may configure and transmit configuration information regarding the TRS resource(s) through SIB-A. The BS may transmit information regarding a change indicator for the configured TRS resource(s) through SIB1 (or SIB1-PDCCH). If the configuration information regarding the TRS resource(s) transmitted by the BS through SIB-A is maintained, the BS may transmit the same value as that of a previously transmitted change indicator through SIB1 (or SIB1-PDCCH). If the configuration information regarding the TRS resource(s) transmitted by the BS through SIB-A is changed, the BS may transmit a different value from that of the previously transmitted change indicator through SIB1(or SIB1-PDCCH). Thereafter, the BS may transmit the paging DCI including TRS validity information at the location of a PO.

As another example, in 3GPP-based wireless communication systems such as LTE and NR, control channel A may be a PDCCH where PEI DCI is transmitted (hereinafter referred to as a PEI-PDCCH). Information A may be configuration information regarding TRS resource(s) where idle/inactive UEs are capable of assuming transmission. SIB-B may be SIB1 carrying RMSI, and Control Channel B may be a PDCCH scheduling a PDSCH for transmission of SIB1 (hereinafter referred to as an SIB1-PDCCH). In this case, information A provided over a PEI-PDCCH may be information indicating whether TRS transmission on the TRS resource(s) configured to the UE is valid (hereinafter referred to as TRS validity information). In addition, SIB1 (or SIB1-PDCCH) may include a change indicator for determining the validity of TRS resource configuration information. When such a method is used, the BS may transmit configuration information regarding the TRS resource(s) through SIB-A. The BS may transmit information regarding a change indicator for the stored TRS resource(s) through SIB1 (or SIB1-PDCCH). If the configuration information regarding the TRS resource(s) transmitted by the BS through SIB-A is maintained, the BS may transmit the same value as that of a previously transmitted change indicator through SIB1 (or SIB1-PDCCH). If the configuration information regarding the TRS resource(s) transmitted by the BS through SIB-A is changed, the BS may transmit a different value from that of the previously transmitted change indicator through SIB1 (or SIB1-PDCCH). Thereafter, the BS may transmit the PEI DCI including TRS validity information at the location of a PEI occasion.

Figure 15:
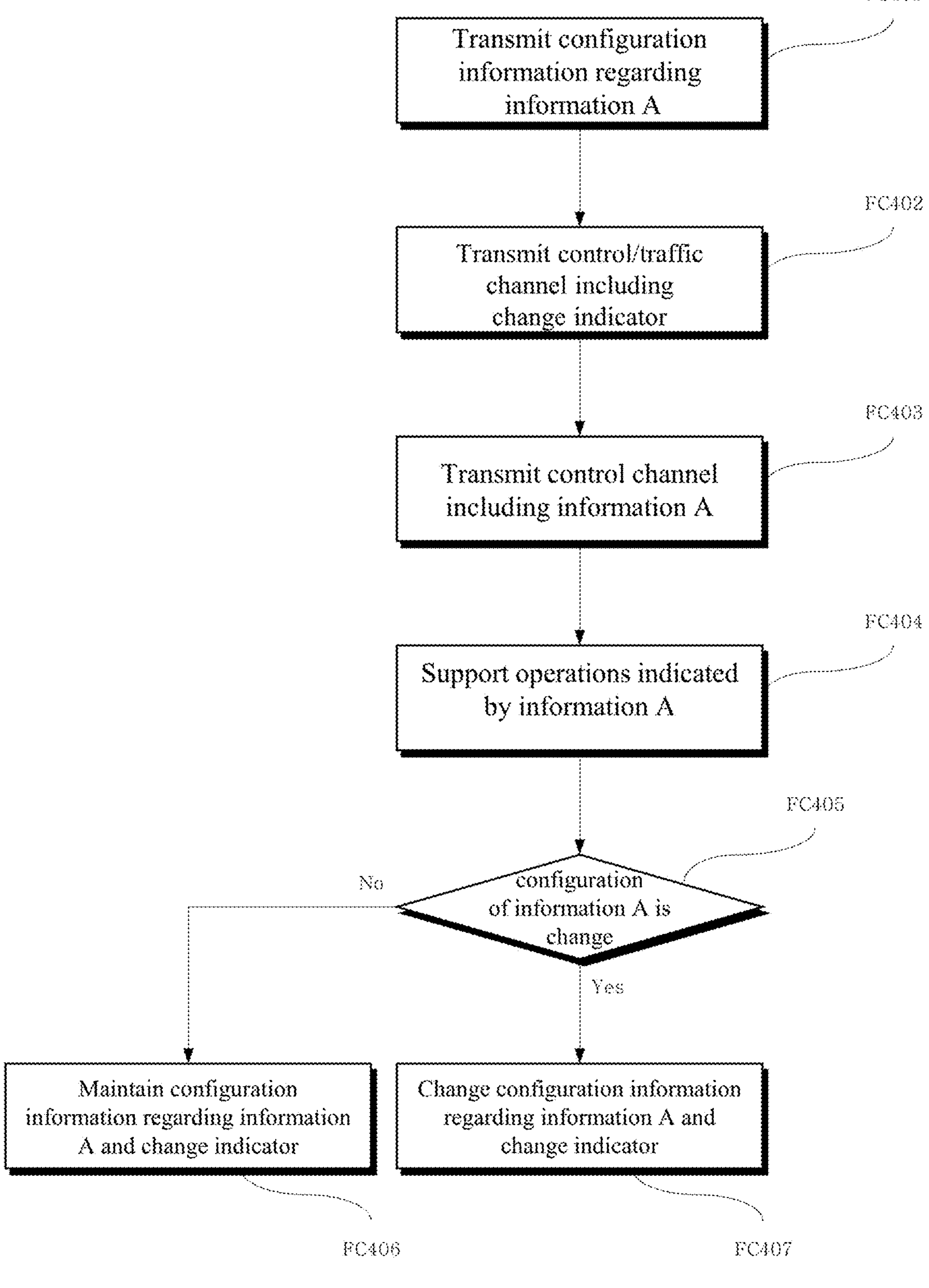
FIG. 15 illustrates exemplary BS operations.

FIG. 15 illustrates exemplary BS operations.

Referring to FIG. 15, the BS may generate and transmit configuration information including information A (FC401). For example, the configuration information may be transmitted through a higher layer signal (e.g., SIB or RRC signaling).

The BS may transmit configuration information including a change indicator for information A over a control or traffic channel transmitted (FC402). For example, when a control channel is used, the configuration information may be transmitted over a physical layer channel (e.g., PDCCH) scheduling a higher layer signal. When a traffic channel is used, the configuration information may be transmitted through a higher layer signal (e.g., SIB or RRC signaling).

Thereafter, if there is control channel A that the BS desires to transmit, the BS may transmit an indication regarding operations related to information A over control channel A (FC403).

In this case, if the operations related to information A are indicated over control channel A, the BS may support the related operations according to the transmitted information (FC404).

Thereafter, if the BS intends to maintain configuration information regarding information A (FC405), the BS may provide the same information in providing the configuration information regarding information A. In addition, the BS may also maintain the value of the change indicator transmitted over control channel A (FC406).

If the BS intends to modify the configuration information regarding information A (FC405), the BS may provide modified information in providing the configuration information regarding information A. In addition, the BS may also modify the value of the change indicator transmitted over control channel A (FC407).

For example, the eDRX structure where the UE monitors a PO at a relatively long cycle may be considered. When the UE has a general DRX cycle, the UE may acquire SI stably by receiving SI update information and applying a modification period to apply the SI update information. On the other hand, when the UE has an eDRX cycle, the UE may maintain a sleep state for a period longer than the modification period (i.e., a state in which the UE does not monitor POs). During the period in which the UE maintains the sleep state, there is a possibility that if an SI update occurs, the UE may perform PO monitoring without reflecting the updated SI. For power saving enhancement operations planned for idle/inactive UEs in Rel-17 NR (e.g., UE group/subgroup indication based on PEI and TRS availability indication based on PEI and paging), operations are instructed via L1 signaling (e.g., paging DCI or PEI) which is received during the paging procedure of the UE. Therefore, when if it is difficult for the UE accurately update information received on a PO or PEI occasion, it may lead to malfunctions in the UE, potentially resulting in performance degradation such as paging reception failure. In NR, SIB1 provides RMSI, and thus SIB1 may be periodically monitored to check information regarding a hyper system frame number (H-SFN) of the UE where eDRX operation is performed. Thus, when the proposed methods are used, if the UE needs to check the H-SFN due to eDRX, the UE may prevent malfunctions by monitoring SIB1 and determining the validity of the Rel-17 NR power saving enhancement operations at the same time. In addition, from the perspective of the network, unnecessary signaling overhead and UE power consumption may be mitigated. Furthermore, since an existing SIB1 transmission channel or a PDCCH scheduling SIB1 is reused, it is possible to prevent an increase in overhead of other L1 signaling.

If the previously indicated TRS availability is no longer available due to changes in the TRS configuration while the UE remains in the sleep state, the UE may prevent issues with time/frequency synchronization errors that may arise when the UE assumes the TRS availability whose support is ended/changed.

Determination of Validity Duration of Configuration Information

In the following, a scenario is considered where the UE receives and stores a configuration for specific information (hereinafter referred to as information A) through a specific SIB (hereinafter referred to as SIB-A) and expects that operations indicated by information A will be provided over a specific control channel (hereinafter referred to as control channel A).

In this case, a duration in which configured information A is valid may be included in SIB-A received by the UE.

As one method of configuring the valid duration, a valid time duration from the time when the UE acquires SIB-A may be configured. If UE fails to acquire different SIB-A before the expiration of the valid time duration, the UE may consider that stored information A is no longer valid. In this case, the length of the valid time duration may be predetermined in specifications, and the length of the valid time duration of SIB-A may be different from the length of the valid time duration of other SIBs. Alternatively, the length of the valid time duration may be provided through SIB-A.

As another method of configuring the valid duration, the UE may be provided with the index (e.g., SFN or H-SFN) of a time unit at which the validity duration of information in SIB-A expires through SIB-A. In this case, the UE may assume that information A is valid until the nearest point in time indicated by the index of the specified time unit.

When a plurality of pieces of information A are provided through SIB-A, the length of the valid duration may be set to a single value per SIB-A, which may reduce network signaling overhead for configuration information.

Alternatively, when a plurality of pieces of information A are provided through SIB-A, the length of the valid duration may be configured for each piece of information A or each group of information A, which may provide scheduling flexibility for the BS for each piece of information A.

If the UE receives new SIB-A, the valid durations may be determined based on last received SIB-A, and information related to previously received information A may no longer be valid. This implies that the UE only stores information A included in last received SIB-A and resets the validity duration of stored information A from the time of reception.

For example, in 3GPP-based wireless communication systems such as LTE and NR, information A may be configuration information regarding TRS resource(s) where idle/inactive UEs are capable of assuming transmission. In this case, the configuration information regarding the TRS resource(s) may be provided through a dedicated SIB (hereinafter referred to as SIB-C). In general, the configuration of TRS resource(s) for UEs in the idle/inactive state may be determined by considering the TRS configuration for UEs in the connected state to avoid an increase in the resource overhead of the BS. Therefore, compared to the general configuration information provided through other SIBs, the configuration information regarding the TRS resource(s) provided through SIB-C should be considered to have a shorter update period. Accordingly, after a time T has passed from the reception of SIB-C, the UE may consider that stored information A is no longer valid and then delete information A. The value of T may be fixed to be less than 3 or configured by the BS through SIB-C.

As another example, in 3GPP-based wireless communication systems such as LTE and NR, information A may be configuration information regarding TRS resource(s) where idle/inactive UEs are capable of assuming transmission. In this case, the configuration information regarding the TRS resource(s) may be provided through a dedicated SIB (hereinafter referred to as SIB-C). In this case, SIB-C may include information regarding a point in time when the validity duration of the configuration of the configured TRS resource(s) ends. The information regarding the point in time may be expressed as the value of a H-SFN, which means that the UE is capable of assuming that the configuration of the TRS resource(s) is valid up to a position corresponding to the value of the H-SFN among frames appearing after receiving the SIB-C. In this case, if the UE does not have H-SFN-related capabilities, the UE may not expect the method of configuring the validity duration based on the H-SFN. In the example, information regarding the H-SFN may be a value uniformly configured for configurations of all TRS resource(s) provided through SIB-C, which may be to reduce the overhead of SIB-C. Alternatively, in the example, the information regarding the H-SFN may be provided for each TRS resource (each TRS resource set or each TRS resource set group). Accordingly, the BS may control each TRS resource (each TRS resource set or each TRS resource set group) to improve network flexibility in terms of radio resource management.

Figure 16:
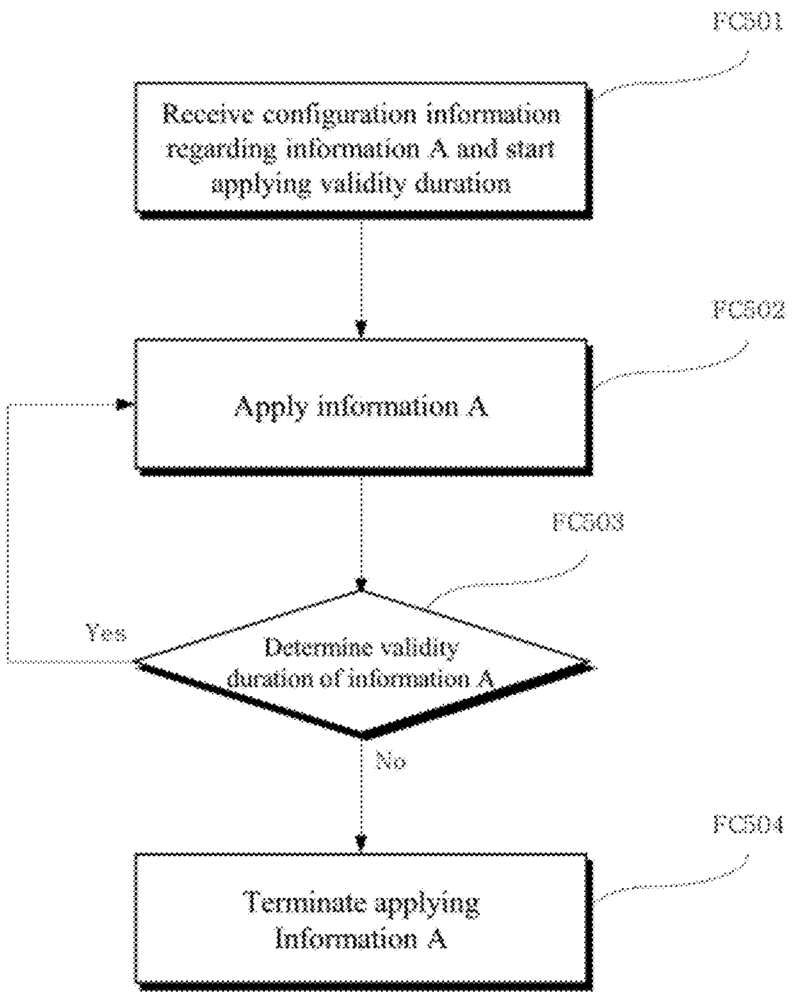
FIG. 16 illustrates exemplary UE operations.

FIG. 16 illustrates exemplary UE operations.

Referring to FIG. 16, the UE may receive configuration information including information A from the BS (FC501). For example, the configuration information may be received through a higher layer signal (e.g., SIB or RRC signaling). In this case, the UE may expect a point in time when the validity duration of received information A is configured and ended. The validity duration may be defined in specifications. Alternatively, the validity duration may also be configured though the higher layer signal in which the configuration information regarding information A is provided.

Thereafter, the UE may expect operations related to information A and apply the operations while the validity duration of information A is applied (FC502).

When the validity duration of the information received by the UE expires (FC503), the UE may delete the stored information regarding information A and no longer expect the related operations (FC504).

The BS may transmit configuration information regarding specific information (hereinafter referred to as information A) through a specific SIB (hereinafter referred to as SIB-A). A validity duration may be configured for SIB-A transmitted by the BS or information A included in SIB-A.

As one method of configuring the valid duration, the BS may configure a valid time duration from the time of transmitting SIB-A. If the BS fails to transmit different SIB-A before the valid time duration expires, the BS may consider that information A is no longer valid. In this case, the length of the valid time duration may be predetermined in specifications, and the length of the valid time duration of SIB-A may be different from the length of the valid time duration of other SIBs. Alternatively, the length of the valid time duration may be configured by the BS and provided through SIB-A.

As another method of configuring the valid duration, the BS may determine a point in time when the validity duration of SIB-A is ended and transmit the index (e.g., SFN or H-SFN) of a time unit at the end point through SIB-A.

When a plurality of pieces of information A are provided through SIB-A, the length of the valid duration may be set to a single value per SIB-A, which may reduce network signaling overhead for configuration information.

Alternatively, when a plurality of pieces of information A are provided through SIB-A, the length of the valid duration may be configured for each piece of information A or each group of information A, which may provide scheduling flexibility for the BS for each piece of information A.

For example, in 3GPP-based wireless communication systems such as LTE and NR, information A may be configuration information regarding TRS resource(s) where idle/inactive UEs are capable of assuming transmission. In this case, the configuration information regarding the TRS resource(s) may be provided through a dedicated SIB (hereinafter referred to as SIB-C). In general, the configuration of TRS resource(s) for UEs in the idle/inactive state may be determined by considering the TRS configuration for UEs in the connected state to avoid an increase in the resource overhead of the BS. Therefore, compared to the general configuration information provided through other SIBs, the configuration information regarding the TRS resource(s) provided through SIB-C should be considered to have a shorter update period. Accordingly, after a time T has passed from transmission of last SIB-C, the BS may expect that there will be no more UEs that determine information A provided through relevant SIB-C to be valid. The value of T may be fixed to be less than 3 or determined and configured by the BS through SIB-C.

As another example, in 3GPP-based wireless communication systems such as LTE and NR, information A may be configuration information regarding TRS resource(s) where idle/inactive UEs are capable of assuming transmission. In this case, the configuration information regarding the TRS resource(s) may be provided through a dedicated SIB (hereinafter referred to as SIB-C). In this case, SIB-C may include information regarding a point in time when the validity duration of the configuration of the configured TRS resource(s) ends. The information regarding the point in time may be expressed as the value of a H-SFN, which means that the BS determines one of the frames that appear after transmission of SIB-C as the point in time when validity duration of information A ends and indicates the value of the H-SFN of the frame. In this case, if the UE does not have H-SFN-related capabilities, the BS may expect the UE will not expect the method of configuring the validity duration based on the H-SFN. In the example, information regarding the H-SFN may be a value uniformly configured for configurations of all TRS resource(s) provided through SIB-C, which may be to reduce the overhead of SIB-C. Alternatively, in the example, the information regarding the H-SFN may be provided for each TRS resource (each TRS resource set or each TRS resource set group). Accordingly, the BS may control each TRS resource (each TRS resource set or each TRS resource set group) to improve network flexibility in terms of radio resource management.

Figure 17:
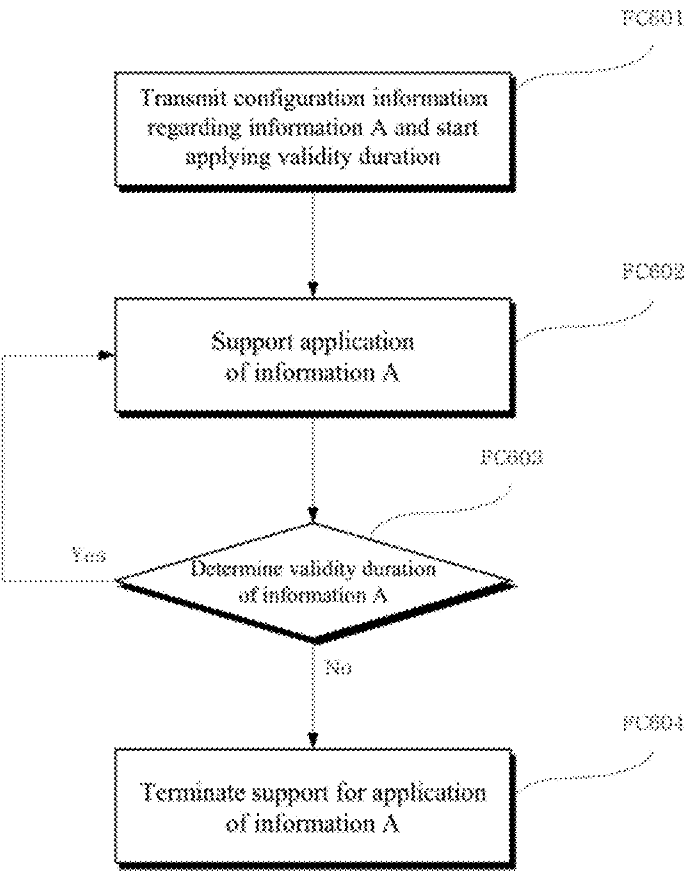
FIG. 17 illustrates exemplary BS operations.

FIG. 17 illustrates exemplary BS operations.

Referring to FIG. 17, the BS may determine and transmit configuration information including information A to support the operations proposed in the present disclosure. (FC601). For example, the configuration information may be transmitted through a higher layer signal (e.g., SIB or RRC signaling). In this case, the BS may configure the validity duration of information A to be transmitted and a point in time when the application is ended. The validity duration may be defined in specifications. Alternatively, the validity duration may also be configured though the higher layer signal in which the configuration information regarding information A is provided.

Thereafter, the BS may support operations related to information A while the validity duration of information A is applied (FC602).

When the validity duration of information A transmitted by the BS expires (FC603), the BS may stop supporting the operation for information A whose validity duration expires (FC504).

For example, the eDRX structure where the UE monitors a PO at a relatively long cycle may be considered. When the UE has a general DRX cycle, the UE may acquire SI stably by receiving SI update information and applying a modification period to apply the SI update information. On the other hand, when the UE has an eDRX cycle, the UE may maintain a sleep state for a period longer than the modification period (i.e., a state in which the UE does not monitor POs). During the period in which the UE maintains the sleep state, there is a possibility that if an SI update occurs, the UE may perform PO monitoring without reflecting the updated SI. For power saving enhancement operations planned for idle/inactive UEs in Rel-17 NR (e.g., UE group/subgroup indication based on PEI and TRS availability indication based on PEI and paging), operations are instructed via L1 signaling (e.g., paging DCI or PEI) which is received during the paging procedure of the UE. Therefore, when if it is difficult for the UE accurately update information received on a PO or PEI occasion, it may lead to malfunctions in the UE, potentially resulting in performance degradation such as paging reception failure. For other SIBs, a validity duration of three hours may be ensured from a point in time when the UE receives the SIBs. However, considering that the maximum length of eDRX may be shorter than three hours, the existing method of ensuring SIB validity may not be suitable for addressing the aforementioned issues. In addition, since the start time of validity is determined based on a point in time at which the BS transmits an SIB, the method of configuring the validity duration for TRS resource(s) based on the point in time at which the BS provides the SIB may be constrained in the applicability thereof. When a method of configuring a short validity duration for received information based on a point in time at which the UE receives an SBI is used among the proposed methods, and when the configured validity duration is defined as T, if UEs are configured with eDRX cycles shorter than T, the UE may be requested to re-verify the validity of existing TRS resource(s) for each eDRX cycle. From the perspective of reducing signaling overhead, it may be advantageous in addressing the inconsistency issue caused by SI updates. When a method of explicitly indicating a point in time at which the configuration information regarding TRS resource(s) is ended based on a H-SFN is used among the proposed methods, the BS may determine and provide information regarding whether TRS resource(s) are supported, thereby ensuring scheduling flexibility for the BS. In addition, the UE may be guaranteed to have access to the TRS resource(s) within the indicated duration, irrespective of the length of the eDRX cycle, which may be advantageous in terms of power saving enhancement.

Method of Skipping Assuming Validity of Information at Some Control Channel Monitoring Locations In the following, a scenario is considered where the UE receives and stores a configuration containing specific information (hereinafter referred to as information A) through a specific SIB (hereinafter referred to as SIB-A) and expects that operations related to information A will be provided over a specific control channel (hereinafter referred to as control channel A).

Figure 18:
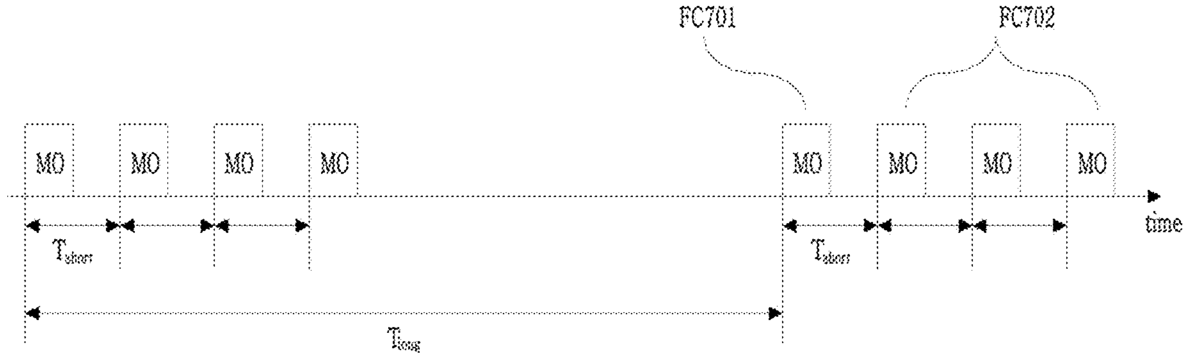
FIG. 18 illustrates an example of monitoring of a control channel based on long and short cycles.

When the UE monitors control channel A, the UE may be configured with two different cycles (i.e., long and short cycles). In this case, it may be considered that MOs for multiple control channels A are repetitively formed at the short cycle with respect to a point in time determined by the long cycle. FIG. 18 illustrates an example of monitoring of control channel A to which long and short cycles are applied. In the example in FIG. 18, an MO refers to a monitoring occasion of control channel A. Four consecutive MOs at the short cycle ($T_{short}$) form a group, and such a MO group is repeated at the long cycle ($T_{long}$). For instance, the interval between a first MO group and a second MO group may correspond to the long cycle ($T_{long}$), while the interval between MOs within the same MO group may correspond to the short cycle ($T_{short}$).

When the UE monitors control channel A and successfully receives control channel A, the validity of information A provided over received control channel A may be applied differently based on the location (index) of the MO of received control channel A.

For example, when MO groups are configured at the long cycle, the UE may not apply the validity of information A for MOs at specific locations within each MO group. For instance, referring to FIG. 18, the UE may apply the validity of information A at a first (leading) MO (FC701) among consecutive MOs for control channel A MOs within the same MO group.

For example, if control channel A involving an SI update indication on a specific MO among MOs in an MO group is received, the UE may not be able to apply the validity of information A during a period from the position of the specific MO until the completion of the SI update.

If the UE is capable assuming the validity of the configuration of information A, the UE may perform the operations related to information A indicated over received control channel A. If the UE is incapable of assuming the validity of the configuration of information A, the UE may not perform the operations related to information A indicated over received control channel A.

For example, in 3GPP-based wireless communication systems such as LTE and NR, control channel A may be a PDCCH where PEI DCI is transmitted (hereinafter referred to as a PEI-PDCCH). Information A may be configuration information regarding TRS resource(s) for idle/inactive UEs. In this case, information A provided over a PEI-PDCCH may be information indicating whether TRS transmission on the TRS resource(s) configured to the UE is valid (hereinafter referred to as TRS validity information) (or information indicating whether the TRS resource configuration configured to the UE is valid). The UE may expect that POs (e.g., MOs for paging DCI) are configured at a DRX cycle (e.g., short cycle) within a paging time window (PTW), which is configured based on an eDRX cycle (e.g., long cycle) and then monitor the POs. Each PEI occasion (e.g., an MO for PEI DCI) may be determined relative to a PO associated with a corresponding PEI. In this case, the UE may not perform TRS-related operations instructed over the PEI-PDCCH received on the PEI occasion associated with a first PO within each PTW (the UE may assume that the configured TRS (resource) information is not valid). If the validity duration of previously indicated TRS validity information is remaining, the UE may not assume TRS transmission in the validity duration of the previously indicated TRS validity information from a reference point (e.g., a PO location last monitored by the UE or a location where the configuration of SIB1/SIB-X is last received) until the first PO. This is because the UE does not know whether the configuration of the TRS resource(s) is updated until the UE receives SI update information through the PEI. Accordingly, the purpose may be to ensure that the UE does not assume the validity of the TRS validity information until the UE checks whether an SI update is indicated (through the PEI reception on the first PO).

As another example, control channel A may be a PDCCH where paging DCI is transmitted (hereinafter referred to as a P-PDCCH). Information A may be configuration information regarding TRS resource(s) for idle/inactive UEs. In this case, information A provided over a P-PDCCH may be information indicating whether TRS transmission on the TRS resource(s) configured to the UE is valid (hereinafter referred to as TRS validity information) (or information indicating whether the TRS resource configuration configured to the UE is valid). The UE may expect that POs (e.g., MOs for paging DCI) are configured at a DRX cycle (e.g., short cycle) within a paging time window (PTW), which is configured based on an eDRX cycle (e.g., long cycle) and then monitor the POs. If the UE receives an SI update indication over the P-PDCCH received on a first PO within the PTW, the UE may not perform TRS-related operations instructed by the P-PDCCH (the UE may assume that the configured TRS (resource) information is not valid). The SI update may be to provide the UE with information regarding the configuration of updated TRS resource(s). That is, considering that the information regarding the configuration of the TRS resource(s) stored by the UE at the time of receiving the P-PDCCH, it is to prevent malfunction of the UE. The assumption regarding the validity may be maintained until the UE receives new SI information. In this case, the SI update may be indicated through the SI update indication included in a short message filed among DCI fields included in the paging DCI (i.e., a first bit in the short message field). Alternatively, if a separate indication bit for updating the configuration of the TRS resource(s) is included in the paging DCI, the UE may assume the validity of TRS validity information and perform related SI update operations based on information provided by the separate indication bit, instead of following the conventional SI update operations. If an indication function is added to the PEI DCI to indicate updates to the configuration of the TRS resource(s) or indicate general SI updates, it may be understood by those skilled in the art that the proposed methods are also be performed based on the PEI-PDCCH (instead of the P-PDCCH). In the operation described above, if the validity duration of previously indicated TRS validity information is remaining, the UE may not assume TRS transmission in the validity duration of the previously indicated TRS validity information from a reference point (e.g., a PO location last monitored by the UE or a location where the configuration of SIB1/SIB-X is last received) until the first PO. If the UE does not receive an indication for SI updates on the first PO within the current PTW, the UE may assume that the validity duration of the previously indicated TRS validity information will be maintained. If the UE receives the indication for SI updates on the first PO within the current PTW, the UE may assume that the validity duration of the previously indicated TRS validity information is not valid.

Figure 19:
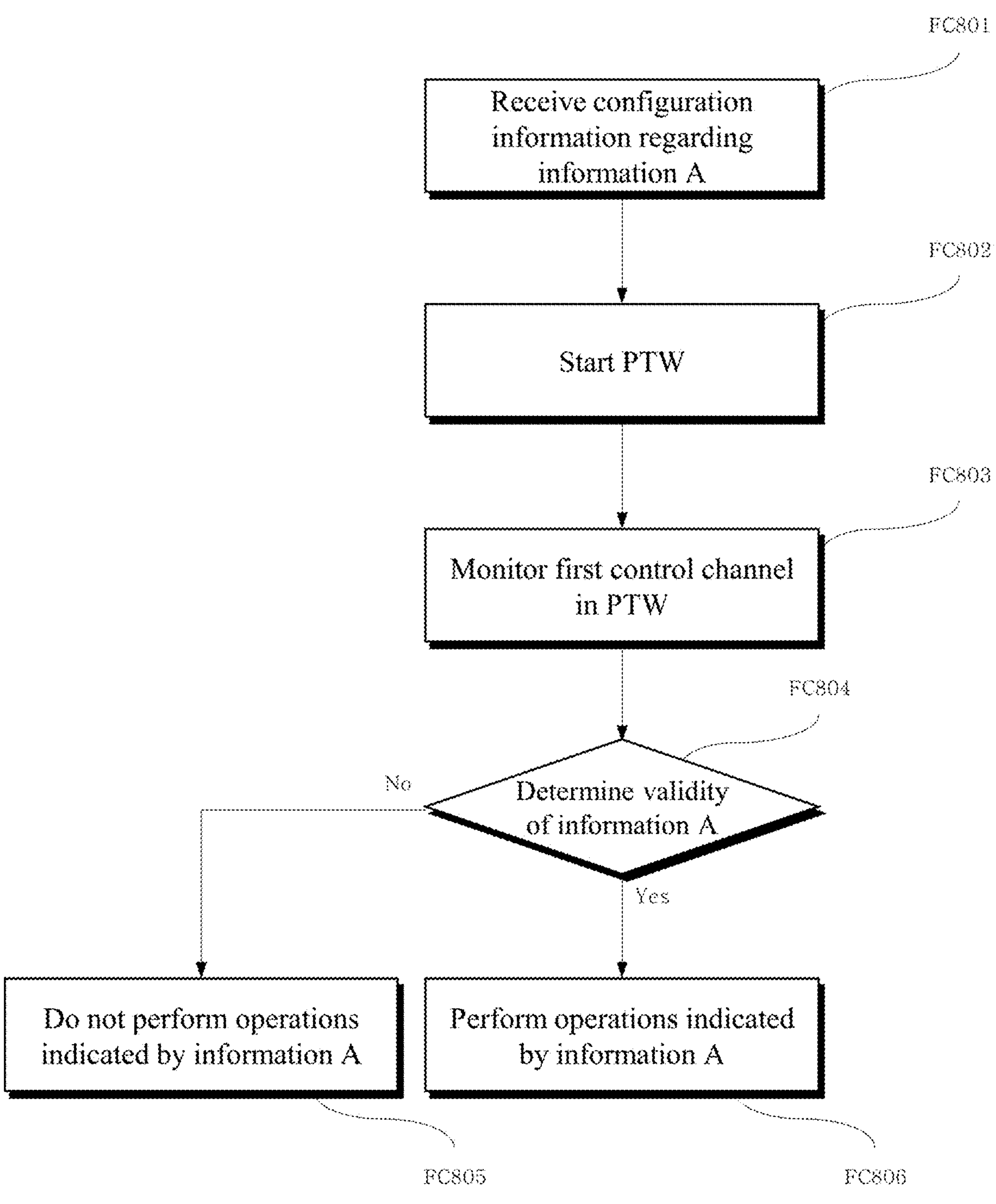
FIG. 19 illustrates exemplary UE operations.

FIG. 19 illustrates exemplary UE operations.

Referring to FIG. 19, the UE may receive configuration information including information A from the BS (FC801). For example, the configuration information may be received through a higher layer signal (e.g., SIB or RRC signaling).

When the UE operates in the eDRX mode, the UE may start monitoring a control channel (e.g., paging PDCCH or PEI PDCCH) in a PTW that is repeated periodically at the eDRX cycle (FC802).

The UE may perform monitoring of the control channel (e.g., paging PDCCH or PEI PDCCH) on a specific (e.g., first) MO within the PTW (FC803).

In this case, if the UE successfully receives the control channel on the specific (e.g., first) MO, and if the received control channel includes information indicating operations related to information A, the UE may determine the validity of information A (FC804). For instance, the criterion for determining the validity may include a time of reception of the control channel, the type of control channel, and/or information included in the control channel.

If received information A is determined to be valid according to the criterion for determining the validity, the UE may perform the operations related to information A indicated over the control channel (FC806).

If received information A is determined to be invalid according to the criterion for determining the validity, the UE may not perform the operations related to information A indicated over the control channel (FC805).

On the other hand, a scenario is considered where the BS transmits a configuration for specific information (hereinafter referred to as information A) through a specific SIB (hereinafter referred to as SIB-A) and indicates operations related to information A over a control channel (hereinafter referred to as control channel A).

In addition, the BS configures two cycles of different sizes (long and short cycles) to monitor control channel A for a specific UE. In this case, it may be considered that MOs for multiple control channels A are repetitively formed at the short cycle with respect to a point in time determined by the long cycle.

The BS may transmit control channel A including information regarding an SI update on a specific (e.g., first) MO of an MO group among MO groups configured at the long cycle for the specific UE.

If the BS instructs the UE to perform an SI update procedure through the information regarding the SI update, the BS may then transmit SIB-A to the UE according to a predetermined procedure.

For example, control channel A may be a PDCCH where paging DCI is transmitted (hereinafter referred to as a P-PDCCH). Information A may be configuration information regarding TRS resource(s) where idle/inactive UEs are capable of assuming transmission. In this case, information A provided over a P-PDCCH may be information indicating whether TRS transmission on the TRS resource(s) configured to the UE is valid (hereinafter referred to as TRS validity information). In addition, the BS may provide the paging DCI based on that a specific UE is monitoring PO(s) at the DRX cycle (e.g., short cycle) within a PTW configured based on the eDRX cycle (e.g., long cycle). The BS may provide an SI update indication over the P-PDCCH for the purpose of informing the UE of an update to the configuration of the TRS resource(s). In particular, if the update to the configuration of the TRS resource(s) is performed in a section other than the PTW of the specific UE (for example, a section where the UE does not monitor POs based on the eDRX cycle), the BS may provide SI update information regarding a first PO in the next PTW of the specific UE. In this case, the SI update may be indicated through the SI update indication included in a short message filed among DCI fields included in the paging DCI (i.e., a first bit in the short message field). Alternatively, a separate indication bit for updating the configuration of the TRS resource(s) may be included in the paging DCI. If indication information is added to PEI DCI to indicate updates to the configuration of the TRS resource(s) or indicate general SI updates, it may be understood by those skilled in the art that the proposed methods are also be performed based on the PEI-PDCCH (instead of the P-PDCCH).

Figure 20:
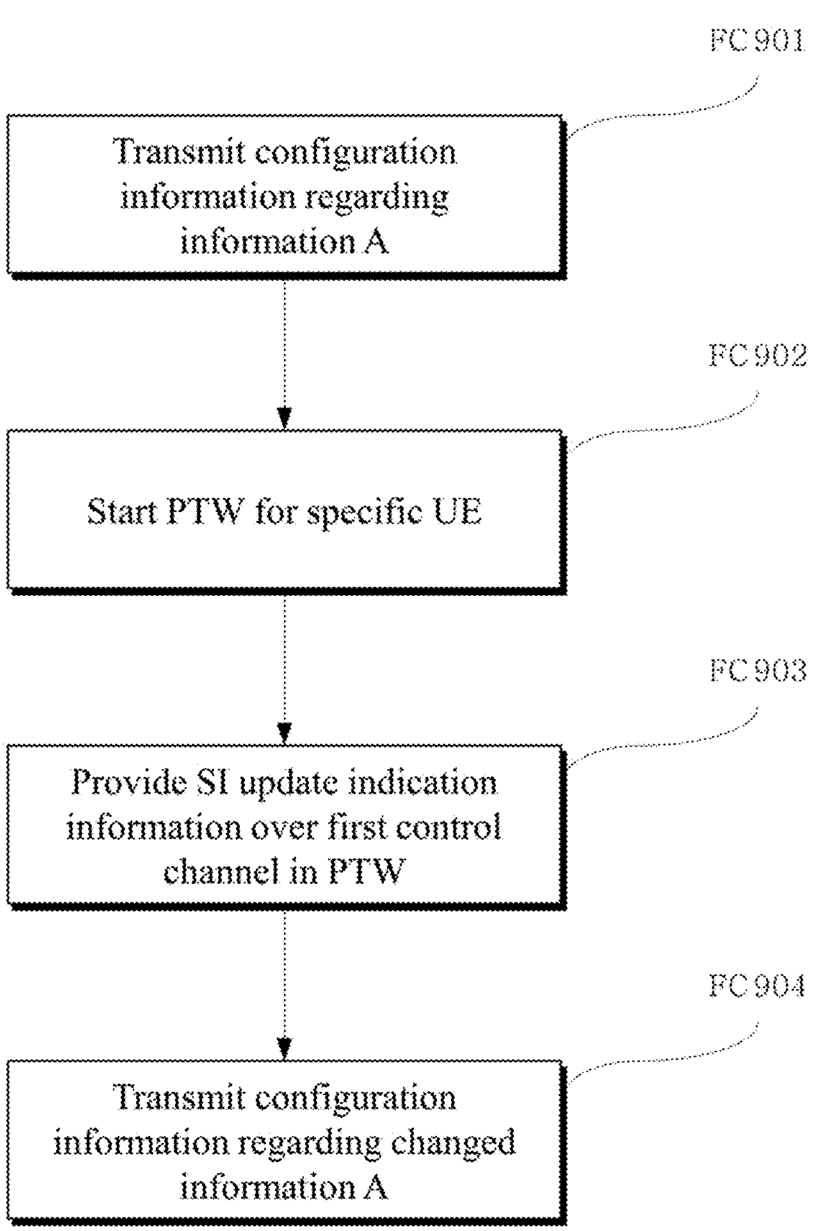
FIG. 20 illustrates exemplary BS operations.

FIG. 20 illustrates exemplary BS operations.

Referring to FIG. 20, the BS may generate/transmit configuration information including information A (FC901). For example, the configuration information may be transmitted through a higher layer signal (e.g., SIB or RRC signaling).

Thereafter, the BS may perform operations related to information A. When the PTW of a specific UE starts (FC902), the BS may transmit a control channel (e.g., paging PDCCH or PEI PDCCH) on a specific (e.g., first) MO in the PTW for the specific UE operating in the eDRX mode. The control channel may include indication information regarding an SI update (FC903).

If transmission of the configuration information including information A is required and if it is indicated over the control channel that the SI update will be performed, the BS may transmit configuration information of changed information A (FC904). If there is no configuration information regarding information A to be transmitted or if it is indicated over the control channel that the SI update will not be performed, the BS may skip transmitting the configuration information regarding information A.

For example, the eDRX structure where the UE monitors a PO at a relatively long cycle may be considered. When the UE has a general DRX cycle, the UE may acquire SI stably by receiving SI update information and applying a modification period to apply the SI update information. On the other hand, when the UE has an eDRX cycle, the UE may maintain a sleep state for a period longer than the modification period (i.e., a state in which the UE does not monitor POs). During the period in which the UE maintains the sleep state, there is a possibility that if an SI update occurs, the UE may perform PO monitoring without reflecting the updated SI. For power saving enhancement operations planned for idle/inactive UEs in Rel-17 NR (e.g., UE group/subgroup indication based on PEI and TRS availability indication based on PEI and paging), operations are instructed via L1 signaling (e.g., paging DCI or PEI) which is received during the paging procedure of the UE. Therefore, when if it is difficult for the UE accurately update information received on a PO or PEI occasion, it may lead to malfunctions in the UE, potentially resulting in performance degradation such as paging reception failure. To address this issue, the UE may be configured to use TRS validity information only after confirming that power-saving enhancement operations are not updated when the PTW starts after the UE sleeps during the eDRX cycle. According to the proposed method, there is an advantageous effect in terms of not providing additional signaling overhead for validity checks because the existing SI update procedure is used without introducing separate indication methods to resolve the issue.

Application of Method According to UE Characteristics or Configuration Information The proposed methods above may be applied depending on the characteristics of the UE and/or configuration information configured to the UE.

For example, the application of the proposed methods may be determined based on the capabilities of the UE. When the UE is capable of eDRX, the UE may operate considering the validity of specific information (hereinafter referred to as information A) as proposed. When the UE incapable of eDRX, the UEs may operate without consideration of the information. When a value that the eDRX-capable UE is capable of recognizing/applying (or should recognize/apply) such as a H-SFN is used as a parameter to determine the validity, this may be to avoid imposing unnecessary complexity on UEs that do not require the parameter by not mandating the operation and implementation of the UEs. Additionally, for UEs operating in the typical DRX mode, it may be considered that the validity of information A is determined through the existing SI update procedure. The condition for eDRX may be replaced with the condition of for the H-SFN.

As another method, the application of the proposed methods may be determined based on the configuration state of eDRX. For example, for eDRX-capable UEs, the methods of determining the validity of information A may be applied if an eDRX cycle is configured and applied. If the eDRX cycle is configured and applied, the methods may not be considered. When a separate transmission procedure for signaling/channels is required to determine the validity, the eDRX-capable UE may apply the procedure as needed (e.g., when the validity of information A is uncertain due to the configuration of the eDRX mode). Otherwise, by omitting unnecessary operations, it is possible to prevent potential increases in additional power consumption of the UE or network overhead.

As another example, for the eDRX-capable UE, if the eDRX parameter is set to a specific value (hereinafter referred to as Thr-A) equal to or greater than a predetermined value, the methods for determining the validity of information A may be applied. If the eDRX parameter is set to a value below (or equal to) Thr-A, the method may not be considered. Considering that the length of the eDRX cycle is set as short as 10.24 seconds and as long as approximately 3 hours, some UEs configured with a short eDRX cycle may expect a SI update procedure similar to that for UEs operating in the DRX mode. In such cases, omitting unnecessary operations may prevent potential increases in additional power consumption of the UE or network overhead. In this case, the value of Thr-A may be predefined in specifications or configured by the BS.

Alternatively, a method of determining not to support operations related to information A based on the capability or configured state of the UE may be used. For example, when the UE is configured with an eDRX cycle and performs a paging procedure at the eDRX cycle, the UE may not perform operations of reflecting TRS validity information provided over a paging PDCCH or PEI PDCCH. This is because it is possible to resolve the ambiguity issue of the configuration of TRS resource(s) due to the eDRX cycle without introducing separate signaling or validity determination procedures for the UE, which may offer advantages in terms of UE complexity and network overhead.

When the application of the method of determining the validity of information A is determined by the proposed conditions, if the UE is configured to apply the validity determination operation, the application of operations related to information A may be determined according to one of the methods proposed in the present disclosure (or a combination thereof). On the other hand, when the UE does not need to apply the validity determination operation, the UE may assume that received information A is always valid. In this case, the method of terminating the validity of received information A may be determined to follow the existing SI validity determination procedures (e.g., time after receiving the SIB or where a new SIB is received).

Figure 21:
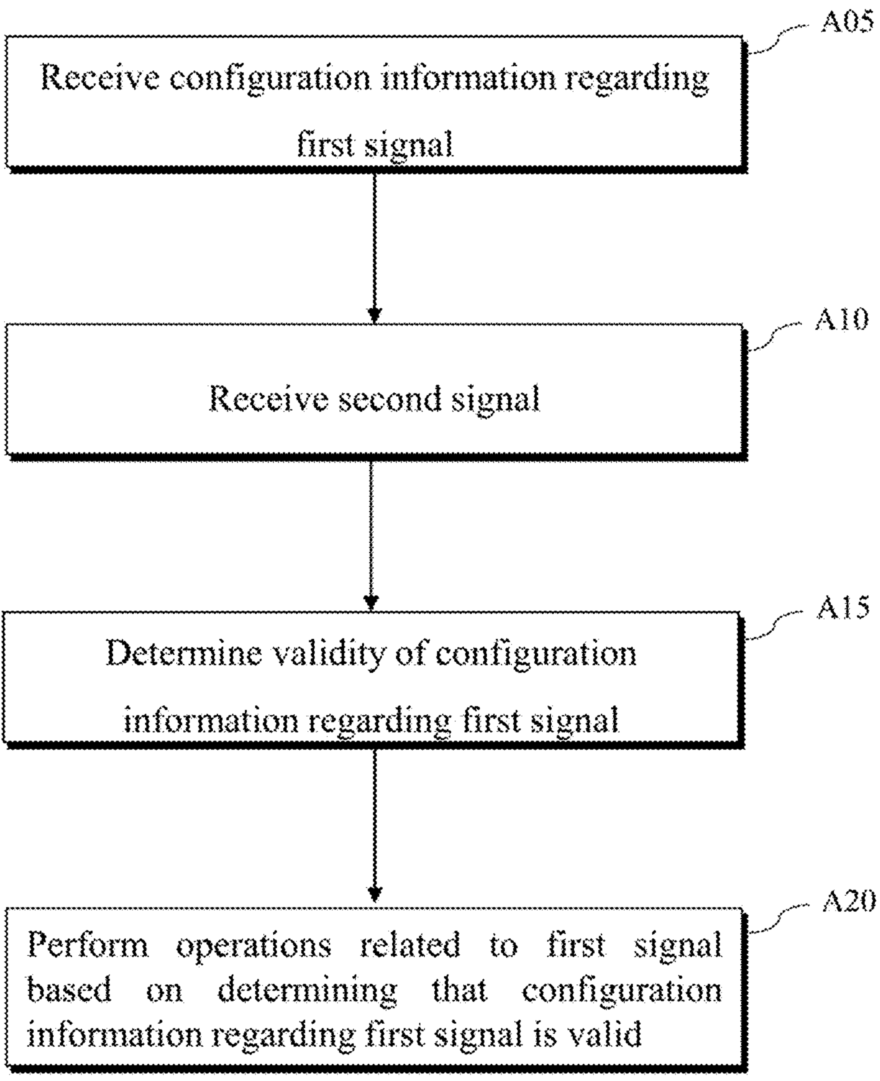
FIG. 21 illustrates a flowchart of a method by which a UE receives a signal according to an embodiment.

FIG. 21 illustrates a flowchart of a method by which a UE receives a signal according to an embodiment.

Referring to FIG. 21, the UE may receive configuration information regarding a first signal (A05).

The UE may receive a second signal including information regarding the first signal on at least one of time resources determined based on a plurality of periodicities configured in the UE (A10).

Based on the reception of the second signal, the UE may determine validity of the configuration information regarding the first signal (A15).

Based on the determination that the configuration information regarding the first signal is valid, the UE may perform operations related to the first signal (A20).

The plurality of periodicities configured in the UE may include a first periodicity and a second periodicity having a smaller length than the first periodicity. The UE may determine an interval between time resource groups related to the time resources based on the first periodicity, and the UE may determine an interval between time resources within each time resource group based on the second periodicity. The UE may determine the validity of the configuration information regarding the first signal based on the location of a time resource on which the second signal is received within a corresponding time resource group.

Based on that the time resource on which the second signal is received within the corresponding time resource group is positioned at a specific location, the UE may determine that the configuration information regarding the first signal is invalid.

Based on that the second signal is received on an initial time resource among time resources included in the corresponding time resource group, the UE may determine that the configuration information regarding the first signal is invalid.

The second signal may include at least one of first information regarding the validity of the configuration information regarding the first signal and second information that instructs to perform the operation related to the first signal.

Preferably, based on that the time resource on which the second signal is received within the corresponding time resource group is positioned at a specific location, the UE may determine that the configuration information regarding the first signal is invalid although the first information included in the second signal indicates that the configuration information regarding the first signal is valid.

Preferably, based on that the time resource on which the second signal is received within the corresponding time resource group is positioned at a specific location, the UE may skip performing the operation related to the first signal indicated by the second information although the second information included in the second signal instructs the UE to perform the operation related to the first signal.

Preferably, based on that the first information indicates that the configuration information regarding the first signal received by the UE is invalid, the UE may skip performing the operation related to the first signal until an update of system information including the configuration information regarding the first signal is completed.

The first periodicity may be related to a PTW cycle of eDRX, and the second periodicity may be related to a DRX cycle.

The first signal may be a reference signal for an RRC idle or RRC inactive mode.

The second signal may be a PDCCH monitored by the UE in the RRC idle or RRC inactive mode.

Figures 22, 23:
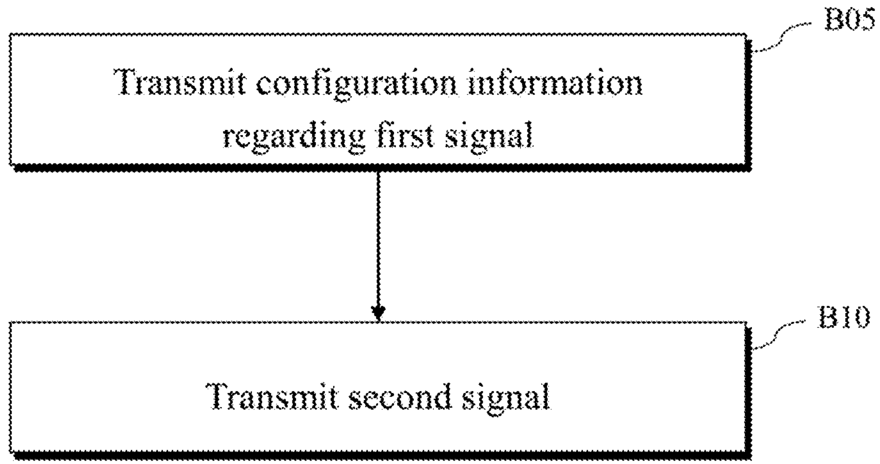
FIG. 22 illustrates a flowchart of a method by which a BS transmits a signal according to an embodiment.
FIG. 23 to FIG. 26 illustrate an example of a communication system 1 and wireless devices applicable to the present disclosure.

FIG. 22 illustrates a flowchart of a method by which a BS transmits a signal according to an embodiment.

Referring to FIG. 22, the BS may transmit configuration information regarding a first signal to a UE (B05).

The BS may transmit a second signal including information regarding the first signal to the UE on at least one of time resources determined based on a plurality of periodicities (B10).

The BS may indicate, to the UE, validity of the configuration information regarding the first signal based on transmitting the second signal. The plurality of periodicities may include a first periodicity and a second periodicity having a smaller length than the first periodicity. An interval between time resource groups related to the time resources may be determined based on the first periodicity, and an interval between time resources within each time resource group may be determined based on the second periodicity. The validity of the configuration information regarding the first signal may be determined based on a location of a time resource on which the second signal is transmitted within a corresponding time resource group.

FIG. 23 illustrates a communication system 1 applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
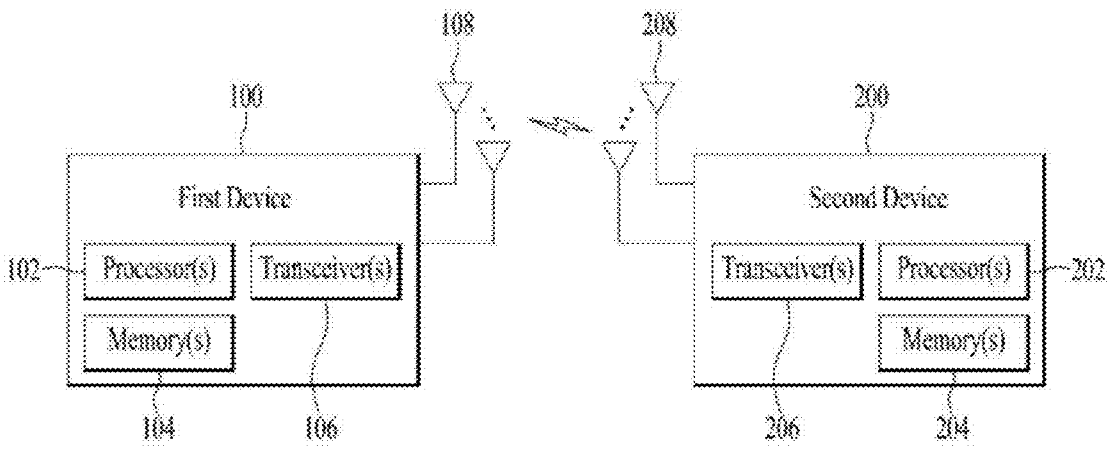

FIG. 24 illustrates wireless devices applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
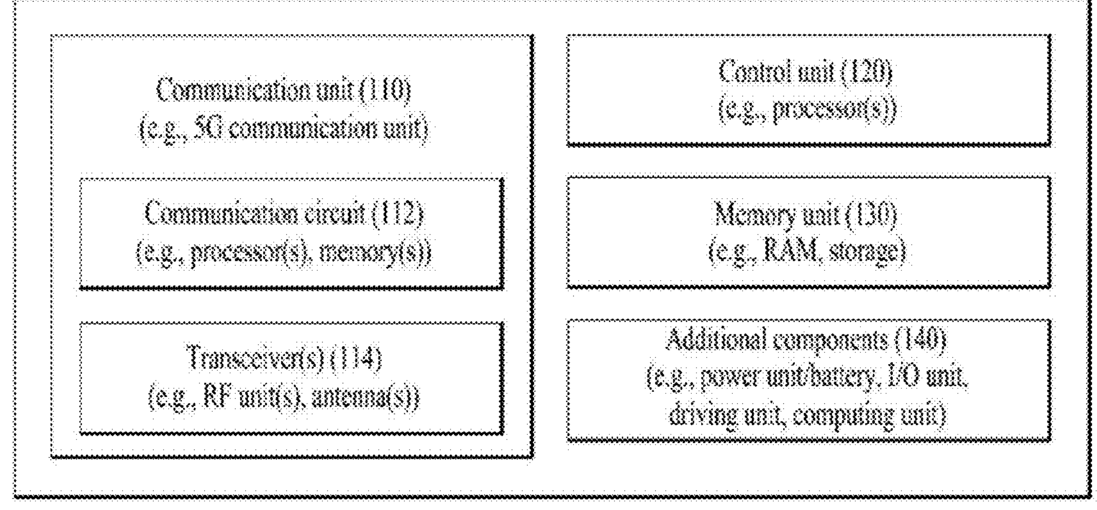

FIG. 25 illustrates another example of a wireless device applied to the present disclosure. The wireless device may be implemented in various forms according to a use-case/service (refer to FIG. 23).

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical the wireless device based operation of on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 23), the vehicles (100*b*-1 and 100*b*-2 of FIG. 23), the XR device (100*c* of FIG. 23), the hand-held device (100*d* of FIG. 23), the home appliance (100*e* of FIG. 23), the IoT device (100*f* of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 26:
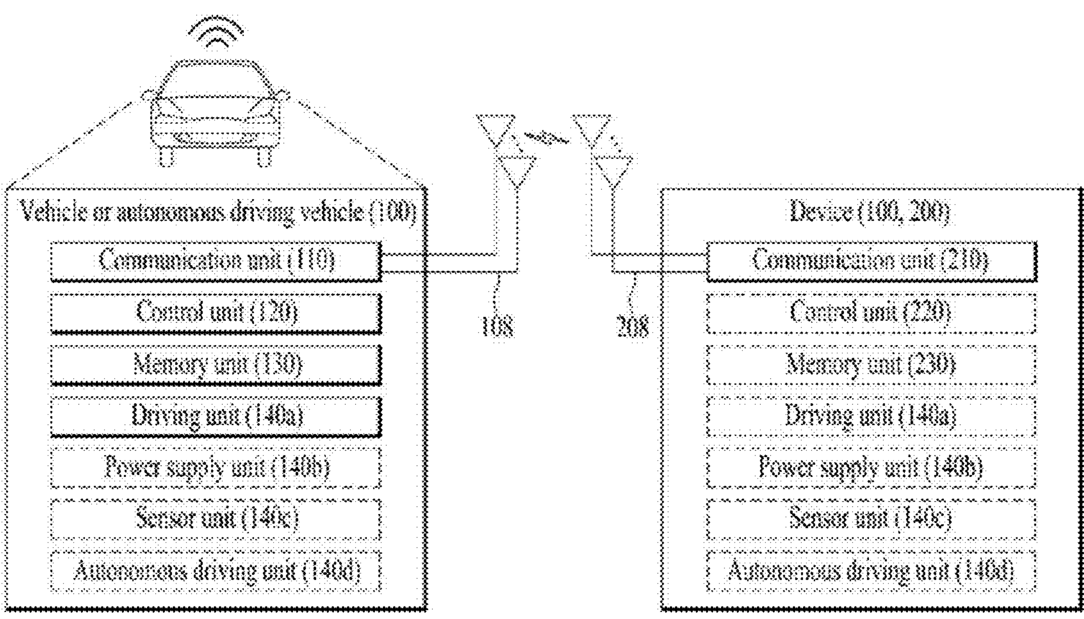

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

What is claimed is:

1. A method of receiving a signal by a user equipment (UE) in a wireless communication system, the method comprising:

receiving configuration information regarding a first signal;

receiving a second signal including information regarding the first signal on at least one of time resources determined based on a plurality of periodicities configured in the UE;

determining validity of the configuration information regarding the first signal based on the reception of the second signal; and performing an operation related to the first signal based on a determination that the configuration information regarding the first signal is valid, wherein the plurality of periodicities configured in the UE include a first periodicity and a second periodicity having a smaller length than the first periodicity, wherein the UE determines an interval between time resource groups related to the time resources based on the first periodicity and determines an interval between time resources within each time resource group based on the second periodicity, and wherein the UE determines the validity of the configuration information regarding the first signal based on a location of a time resource on which the second signal is received within a corresponding time resource group.

2. The method of claim 1, wherein based on that the time resource on which the second signal is received within the corresponding time resource group is positioned at a specific location, the UE determines that the configuration information regarding the first signal is invalid.

3. The method of claim 1, wherein based on that the second signal is received on an initial time resource among time resources included in the corresponding time resource group, the UE determines that the configuration information regarding the first signal is invalid.

4. The method of claim 1, wherein the second signal includes at least one of first information regarding the validity of the configuration information regarding the first signal and second information that instructs to perform the operation related to the first signal.

5. The method of claim 4, wherein based on that the time resource on which the second signal is received within the corresponding time resource group is positioned at a specific location, the UE determines that the configuration information regarding the first signal is invalid although the first information included in the second signal indicates that the configuration information regarding the first signal is valid.

6. The method of claim 4, wherein based on that the time resource on which the second signal is received within the corresponding time resource group is positioned at a specific location, the UE skips performing the operation related to the first signal indicated by the second information although the second information included in the second signal instructs the UE to perform the operation related to the first signal.

7. The method of claim 4, wherein based on that the first information indicates that the configuration information regarding the first signal received by the UE is invalid, the UE skips performing the operation related to the first signal until an update of system information including the configuration information regarding the first signal is completed.

8. The method of claim 1, wherein the first periodicity is related to a paging time window (PTW) cycle of extended discontinuous reception (eDRX), and wherein the second periodicity is related to a discontinuous reception (DRX) cycle.

9. The method of claim 1, wherein the first signal is a reference signal for a radio resource control (RRC) idle or RRC inactive mode, and wherein the second signal is a physical downlink control channel (PDCCH) monitored by the UE in the RRC idle or RRC inactive mode.

10. A processor-readable recording medium having recorded thereon a program for executing the method of claim 1.

11. A device for wireless communication, the device comprising:

a memory configured to store instructions; and a processor configured to perform operations by executing the instructions, wherein the operations of the processor comprise:

receiving configuration information regarding a first signal;

receiving a second signal including information regarding the first signal on at least one of time resources determined based on a plurality of periodicities configured in the UE;

determining validity of the configuration information regarding the first signal based on the reception of the second signal; and performing an operation related to the first signal based on a determination that the configuration information regarding the first signal is valid, wherein the plurality of periodicities include a first periodicity and a second periodicity having a smaller length than the first periodicity, wherein the processor is configured to determine an interval between time resource groups related to the time resources based on the first periodicity and determine an interval between time resources within each time resource group based on the second periodicity, and wherein the processor is configured to determine the validity of the configuration information regarding the first signal based on a location of a time resource on which the second signal is received within a corresponding time resource group.

12. The device of claim 11, wherein the device is an application-specific integrated circuit (ASIC) or a digital signal processor.

13. The device of claim 11, wherein the device is a user equipment (UE) operating in a 3rd generation partnership project (3GPP) based wireless communication system.

14. A method of transmitting a signal by a base station (BS) in a wireless communication system, the method comprising:

transmitting configuration information regarding a first signal to a user equipment (UE); and transmitting, to the UE, a second signal including information regarding the first signal on at least one of time resources determined based on a plurality of periodicities, wherein the BS indicates, to the UE, validity of the configuration information regarding the first signal based on transmitting the second signal, wherein the plurality of periodicities include a first periodicity and a second periodicity having a smaller length than the first periodicity, wherein an interval between time resource groups related to the time resources is determined based on the first periodicity, wherein an interval between time resources within each time resource group is determined based on the second periodicity, and wherein the validity of the configuration information regarding the first signal is determined based on a location of a time resource on which the second signal is transmitted within a corresponding time resource group.

15. A base station (BS) for wireless communication, the BS comprising:

a transceiver; and a processor configured to:

transmit configuration information regarding a first signal to a user equipment (UE); and transmit, to the UE, a second signal including information regarding the first signal on at least one of time resources determined based on a plurality of periodicities, wherein the processor is configured to indicate, to the UE, validity of the configuration information regarding the first signal based on transmitting the second signal, wherein the plurality of periodicities include a first periodicity and a second periodicity having a smaller length than the first periodicity, wherein an interval between time resource groups related to the time resources is determined based on the first periodicity, wherein an interval between time resources within each time resource group is determined based on the second periodicity, and wherein the validity of the configuration information regarding the first signal is determined based on a location of a time resource on which the second signal is transmitted within a corresponding time resource group.

* * * * *